US012800843B2

(12) United States Patent
Song et al.

(10) Patent No.: US 12,800,843 B2
(45) Date of Patent: Nov. 17, 2026

(54) OPTICAL/ELECTRICAL HYBRID MALE CONNECTOR, FEMALE CONNECTOR, AND OPTICAL/ELECTRICAL HYBRID CONNECTOR SYSTEM

(71) Applicant: HUAWEI TECHNOLOGIES CO., LTD., Shenzhen (CN)

(72) Inventors: Min Song, Dongguan (CN); Jincan Cao, Nanjing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 534 days.

(21) Appl. No.: 18/318,422

(22) Filed: May 16, 2023

(65) Prior Publication Data

US 2023/0288640 A1 Sep. 14, 2023

Related U.S. Application Data

(63) Continuation of application No. PCT/CN2021/111342, filed on Aug. 6, 2021.

(30) Foreign Application Priority Data

Nov. 17, 2020 (CN) ........................ 202011288418.9

(51) Int. Cl.

| | |
|---|---|
| ***G02B 6/38*** | (2006.01) |
| ***H01R 13/11*** | (2006.01) |
| ***H01R 13/26*** | (2006.01) |
| ***H01R 13/506*** | (2006.01) |
| ***H01R 31/06*** | (2006.01) |

(52) U.S. Cl.
CPC ......... *G02B 6/3817* (2013.01); *G02B 6/3831* (2013.01); *H01R 13/506* (2013.01); *H01R 31/06* (2013.01); *H01R 13/112* (2013.01); *H01R 13/26* (2013.01)

(58) Field of Classification Search
CPC ...... G02B 6/38; G02B 6/3817; G02B 6/3831; H01R 13/506; H01R 31/06
See application file for complete search history.

(56) References Cited

U.S. PATENT DOCUMENTS 6,588,938 B1 7/2003 Lampert et al.
2007/0116411 A1* 5/2007 Benton ................ G02B 6/3895 385/75

(Continued)

FOREIGN PATENT DOCUMENTS

CN 101223465 A 7/2008
CN 102237598 A 11/2011

(Continued)

*Primary Examiner* — Tina Wong
(74) *Attorney, Agent, or Firm* — WOMBLE BOND DICKINSON (US) LLP

(57) ABSTRACT

Embodiments of the present disclosure include an optical/electrical hybrid male connector, a female connector, and an optical/electrical hybrid connector system. The optical/electrical hybrid male connector includes a male base and at least two optical connectors. The male base includes a base body and at least two male accommodating channels disposed on the base body. The at least two male accommodating channels one-to-one correspond to the at least two optical connectors, and each optical connector is mounted on one corresponding male accommodating channel.

11 Claims, 18 Drawing Sheets

100

(56) References Cited

U.S. PATENT DOCUMENTS

| | | | | |
|---|---|---|---|---|
| 2013/0089290 | A1* | 4/2013 | Sloey ................... | G02B 6/3817<br>385/74 |
| 2017/0285271 | A1 | 10/2017 | Sipes, Jr. et al. | |
| 2018/0031775 | A1* | 2/2018 | Gurreri ................ | G02B 6/3821 |
| 2019/0271811 | A1* | 9/2019 | Kawashima ......... | G02B 6/3897 |
| 2020/0326490 | A1* | 10/2020 | Cui ...................... | G02B 6/3869 |

FOREIGN PATENT DOCUMENTS

| | | | |
|---|---|---|---|
| CN | 205490983 | U | 8/2016 |
| CN | 109564330 | A | 4/2019 |
| CN | 110224278 | A | 9/2019 |
| CN | 216598120 | U | 5/2022 |
| KR | 101760290 | B1 | 7/2017 |

* cited by examiner

OPTICAL/ELECTRICAL HYBRID MALE CONNECTOR, FEMALE CONNECTOR, AND OPTICAL/ELECTRICAL HYBRID CONNECTOR SYSTEM

CROSS-REFERENCE TO RELATED APPLICATIONS

This application is a continuation of International Application No. PCT/CN2021/111342, filed on Aug. 6, 2021, which claims priority to Chinese Patent Application No. 202011288418.9, filed on Nov. 17, 2020. The disclosures of the aforementioned applications are hereby incorporated by reference in their entireties.

TECHNICAL FIELD

This application relates to the field of connector technologies, and in particular, to an optical/electrical hybrid male connector, a female connector, and an optical/electrical hybrid connector system.

BACKGROUND

Currently, a network cable may be used for communication between an access switch and an access point (AP). The network cable may have a power over Ethernet (PoE) function. When an access rate is increased to 10 G or higher, an optical module and an optical fiber are required for communication because the network cable cannot meet a requirement for 200 m communication while the rate is increased. An optical/electrical hybrid cable is used to implement a function of supplying power to the AP and meet a routing process requirement. When the optical/electrical hybrid cable is used, the optical module may cooperate with an additional power supply interface such as an RJ45, that is, an optical connection apparatus and an electrical connection apparatus that are separated are used. In this way, large space is occupied.

SUMMARY

Embodiments of this application provide an optical/electrical hybrid male connector, a female connector, and an optical/electrical hybrid connector system that reduce occupied space.

According to a first aspect, this application provides an optical/electrical hybrid male connector, including a male base and at least two optical connectors. The male base includes a base body and at least two male accommodating channels disposed on the base body, the at least two male accommodating channels one-to-one correspond to the at least two optical connectors, and each optical connector is mounted on one corresponding male accommodating channel. The optical/electrical hybrid male connector further includes at least one male electrical connector disposed on the base body, and each male electrical connector is correspondingly located between two optical connectors.

The male electrical connector is configured to be inserted into a female electrical connector at a female connector of an optical/electrical hybrid connector system, to implement an electrical connection between an optical/electrical hybrid connector and the female connector.

According to the optical/electrical hybrid male connector provided in this application, the optical connector and the electrical connector are disposed as a whole, that is, the optical/electrical hybrid male connector has an optical interface and is compatible with an electrical interface, to implement synchronous insertion and removal of the optical connector and the electrical connector, facilitate installation and removal between the optical/electrical hybrid male connector and the female connector, reduce an onsite construction addressing time and an assembly time, and effectively improve onsite installation efficiency. In addition, each male electrical connector is protrudedly disposed on the base body and is located between two optical connectors, so that idle space between the two optical connectors on the optical/electrical hybrid male connector is effectively used without occupying other space, thereby improving space utilization of the optical/electrical hybrid male connector.

Communication between a conventional access switch and a conventional access point is implemented by using a separate optical connection apparatus and electrical connection apparatus. In this way, an area of a coupling interface for coupling and connecting the access switch to the optical connection apparatus and the electrical connection apparatus is large.

The optical/electrical hybrid male connector provided in this application is compatible with an electrical interface without changing an existing area of an optical interface of a male connector. In an application scenario in which the access switch is connected to the access point by using the optical/electrical hybrid connector system, the optical/electrical hybrid connector system includes the optical/electrical hybrid male connector and a female connector coupled to the optical/electrical hybrid male connector. The female connector of the optical/electrical hybrid connector system is an optical module disposed on the access switch. When an optical signal can be transmitted bidirectionally between the access switch and the access point by using the optical connector disposed on the optical/electrical hybrid male connector, the access switch may also supply power by using the electrical connector on the optical/electrical hybrid male connector. Because each male electrical connector is disposed on the base body and is located between the two optical connectors, idle space between the two optical connectors on the optical/electrical hybrid male connector is effectively used. In this way, the area of the coupling interface of the access switch does not need to be increased additionally. This also means that, on coupling interfaces, with a same area, of the switch, more optical/electrical hybrid male connectors provided in this application can be arranged in comparison with the separate male connector provided with only the optical connector and electrical connector.

It may be understood that the male electrical connector may be disposed with the base body as a whole, and the male electrical connector may also be fastened on the base body in a manner such as screw fastening. This is not limited herein.

According to the first aspect, in a first possible embodiment of the first aspect of this application, the base body includes a main body and a cover body that covers the main body, the main body and the cover body jointly enclose to form the at least two male accommodating channels, and the at least one male electrical connector is mounted on at least one of the main body and the cover body. Because a position of the optical connector can be limited on the male base by an inner wall of the male accommodating channel, the optical connector and the male base are connected as a whole, which helps reduce a possibility of a relative position change between the optical connector and the male base, thereby improving stability and quality of the optical signal transmitted by the optical connector. In addition, the main body and the cover body form the base body, which is conducive to enhancing strength of the male base.

According to the first aspect or the first possible embodiment of the first aspect of this application, in a second possible embodiment of the first aspect of this application, the at least one male electrical connector is detachably disposed on the main body. The male electrical connector and the base body are not disposed as a whole. The male electrical connector is detachably mounted on the main body. If one of the male electrical connector and the male base is faulty, it is convenient to replace, repair, and the like, and a component that is not faulty may also be reused.

According to the first aspect or the first and the second possible embodiments of the first aspect of this application, in a third possible embodiment of the first aspect of this application, the cover body and the main body jointly enclose to form at least one mounting channel, each mounting channel is correspondingly located between two male accommodating channels, the at least one mounting channel one-to-one corresponds to the at least one male electrical connector, and each male electrical connector is penetratedly disposed on one corresponding mounting channel. The male electrical connector is penetratedly mounted on the mounting channel, so that the male electrical connector is detachably connected to the main body, thereby facilitating assembly and disassembly.

According to the first aspect or the first to the third possible embodiments of the first aspect of this application, in a fourth possible embodiment of the first aspect of this application, the main body includes a first end wall and a second end wall that are oppositely disposed, at least one mounting slot is disposed on the first end wall, and the cover body and an inner wall of the mounting slot jointly enclose to form the mounting channel; the at least one mounting slot one-to-one corresponds to the at least one male electrical connector, and each mounting slot is correspondingly located between the two male accommodating channels; and each male electrical connector is penetratedly disposed into one corresponding mounting slot. During assembly, the male electrical connector may be first placed in the mounting slot, and then the cover body is fastened on the main body, so that an inner wall of the mounting channel limits a position of the male electrical connector on the male base, thereby facilitating assembly of the optical/electrical hybrid male connector.

According to the first aspect or the first to the fourth possible embodiments of the first aspect of this application, in a fifth possible embodiment of the first aspect of this application, the cover body includes a cover part and at least one limiting part that is protrudedly disposed on the cover part, at least one limiting part one-to-one corresponds to the at least one mounting slot, each limiting part is correspondingly accommodated in one mounting slot, and each limiting part and an inner wall of the corresponding mounting slot jointly enclose to form the mounting channel. The limiting part is accommodated in the corresponding mounting slot, and the limiting part and the male electrical connector are stacked, to limit movement of the male electrical connector in a direction in which the limiting part and the male electrical connector are stacked. This helps further improve connection stability between the male connector and the male base.

According to the first aspect or the first to the fifth possible embodiments of the first aspect of this application, in a sixth possible embodiment of the first aspect of this application, the main body further includes a peripheral wall connected between the first end wall and the second end wall, the first end wall, the second end wall, and the peripheral wall jointly enclose to form a hollow cavity, the cover body covers the hollow cavity, the mounting channel is in communication with the hollow cavity, the male accommodating channel is in communication with the hollow cavity, the male electrical connector includes a first end and a second end that are oppositely disposed, the first end of the male electrical connector is exposed outside the base body, and the second end of the male electrical connector is accommodated in the hollow cavity. In this way, when the optical connector is penetratedly mounted on the male accommodating channel, the optical connector part, the male electrical connector, and another element can share the hollow cavity, thereby reducing space occupied by the male base, and facilitating miniaturization development of the optical/electrical hybrid male connector.

According to the first aspect or the first to the sixth possible embodiments of the first aspect of this application, in a seventh possible embodiment of the first aspect of this application, the main body further includes a blocking part that is protrudedly disposed on an inner wall of the hollow cavity, and the second end of the male electrical connector is in contact with the blocking part. The blocking part is configured to reduce a possibility that the male electrical connector moves relative to the male base.

According to the first aspect or the first to the seventh possible embodiments of the first aspect of this application, in an eighth possible embodiment of the first aspect of this application, a first guiding part is disposed on a surface that is of the blocking part and that faces the first end wall, a second guiding part is formed on an end face that is of the second end of the male electrical connector and that faces away from the first end, and the first guiding part is slidably connected to the second guiding part. The first guiding part and the second guiding part are configured to guide a movement of the male electrical connector relative to the mounting slot. One of the first guiding part and the second guiding part is a groove, and the other of the first guiding part and the second guiding part is a protrusion.

According to the first aspect or the first to the eighth possible embodiments of the first aspect of this application, in a ninth possible embodiment of the first aspect of this application, the main body includes a first end wall and a second end wall that are oppositely disposed, at least two male accommodating slots are disposed on the first end wall, the at least two male accommodating slots one-to-one correspond to the at least two optical connectors, each optical connector is correspondingly penetratedly disposed into one male accommodating slot, and the cover body and an inner wall of the male accommodating slot jointly enclose to form the male accommodating channel.

During assembly, the optical connector may be first placed in the male accommodating slot, and then the cover body is fastened on the main body, so that the inner wall of the male accommodating channel limits a position of the optical connector on the male base, thereby facilitating assembly of the optical connector and the optical/electrical hybrid male connector.

According to the first aspect or the first to the ninth possible embodiments of the first aspect of this application, in a tenth possible embodiment of the first aspect of this application, the cover body includes a cover part and at least two position-limiting parts that are protrudedly disposed on the cover part, the cover part covers the main body, the male accommodating slot penetrates through an end face that is of the first end wall and that faces the cover part, the at least two position-limiting parts one-to-one correspond to the at least two male accommodating slots, and each position-limiting part is correspondingly accommodated in one male accommodating slot, and each position-limiting part and an inner wall of the corresponding male accommodating slot jointly enclose to form the male accommodating channel. The position-limiting part is accommodated in the corresponding male accommodating slot, and the position-limiting part and the optical connector are stacked, to limit movement of the optical connector in a direction in which the position-limiting part and the optical connector are stacked, thereby further improving connection stability between the optical connector and the male base.

According to the first aspect or the first to the tenth possible embodiments of the first aspect of this application, in an eleventh possible embodiment of the first aspect of this application, the main body further includes a peripheral wall, the peripheral wall is connected between the first end wall and the second end wall, a first fastener part is disposed on the peripheral wall, the cover body further includes a connection part and a second fastener part, the connection part is movably connected to the cover part, the second fastener part is disposed on the connection part, and the second fastener part is latched to the first fastener part. The connection part is movably connected to the cover part, so that the connection part can rotate relative to the cover part, thereby facilitating assembly between the cover body and the base body. The base body and the cover body are fastened in a latching manner, which facilitates assembly and disassembly between the cover body and the base body.

According to the first aspect or the first to the eleventh possible embodiments of the first aspect of this application, in a twelfth possible embodiment of the first aspect of this application, a groove is formed on an outer surface that is of the peripheral wall and that faces the outside of the main body, the first fastener part is disposed on an inner wall of the groove, and the connection part is accommodated in the groove. Therefore, external space of the base body is not occupied when the connection part is disposed on the peripheral wall, which improves space utilization of the base body and is beneficial to miniaturization development of the optical/electrical hybrid male connector.

According to the first aspect or the first to the twelfth possible embodiments of the first aspect of this application, in a thirteenth possible embodiment of the first aspect of this application, the male electrical connector includes a male insertion part and a male contact terminal, an insertion slot is provided on an end face that is of the male insertion part and that faces away from the base body, the insertion slot is configured to accommodate an insertion part of the female electrical connector, and the male contact terminal is disposed on an inner wall of the insertion slot.

The male contact terminal is configured to be electrically connected to a female contact terminal of the female electrical connector. The insertion slot can limit an insertion part of the female electrical connector when the insertion part is inserted, to facilitate insertion between the male electrical connector and the female electrical connector.

According to the first aspect or the first to the thirteenth possible embodiments of the first aspect of this application, in a fourteenth possible embodiment of the first aspect of this application, the male accommodating channel extends in a first direction, the at least two male accommodating channels are arranged in a second direction, there are two male contact terminals on each male electrical connector, the inner wall of the insertion slot includes a first side wall and a second side wall, the first side wall and the second side wall are oppositely disposed in a third direction, any two of the first direction, the second direction, and the third direction are orthogonal to each other, one male contact terminal is disposed on the first side wall, and the other male contact terminal is disposed on the second side wall.

Because the two male contact terminals (also referred to as two poles) are disposed on the inner wall of the insertion slot in the third direction (that is, a thickness direction of the optical/electrical hybrid male connector), and do not occupy space in an arrangement direction of the male accommodating channels (that is, a transverse direction of the optical/electrical hybrid male connector), the male contact terminal and the optical connector do not interfere with each other or affect each other. In other words, the male contact terminal effectively uses idle space of the male base in the third direction, space utilization of the optical/electrical hybrid male connector is further improved, and a volume of the optical/electrical hybrid male connector is effectively reduced, thereby facilitating miniaturization development of the optical/electrical hybrid male connector.

According to the first aspect or the first to the fourteenth possible embodiments of the first aspect of this application, in a fifteenth possible embodiment of the first aspect of this application, the base body includes a support part and at least one connection part that is protrudedly disposed on the support part, a male cable routing structure electrically connected to the male contact terminal is disposed on the support part, and each connection part is disposed with two male accommodating channels.

According to the first aspect or the first to the fifteenth possible embodiments of the first aspect of this application, in a sixteenth possible embodiment of the first aspect of this application, the male base further includes a male latch, the male latch includes a fastened end and a pre-pressed end that are oppositely disposed, the fastened end is fastenedly connected to a top surface that is of the connection part and that faces away from the support part, and the pre-pressed end abuts against the optical connector mounted on the male accommodating channel, which improves stability of the optical connector disposed on the male base. In addition, the male cable routing structure is disposed at the bottom of the base body, and is disposed opposite to the male latch, so that space of the male base is maximized, and the male cable routing structure does not occupy space outside the male base, and does not affect insertion and unlocking.

According to the first aspect or the first to the sixteenth possible embodiments of the first aspect of this application, in a seventeenth possible embodiment of the first aspect of this application, a male clamping protrusion is disposed on an inner wall of the male accommodating channel, and the male clamping protrusion is latched to the optical connector mounted on the male accommodating channel, to facilitate assembly and disassembly of the optical connector and the male base.

According to the first aspect or the first to seventeenth possible embodiments of the first aspect of this application, in an eighteenth possible embodiment of the first aspect of this application, the optical connector is an LC connector. A standard LC connector is used for easy use.

According to the first aspect or the first to the eighteenth possible embodiments of the first aspect of this application, in a nineteenth possible embodiment of the first aspect of this application, there are two optical connectors, and there are two male accommodating channels, to reduce tolerance and precision during manufacturing of the optical/electrical hybrid male connector, thereby reducing production costs and production difficulty of the optical/electrical hybrid male connector.

According to a second aspect, this application provides a female connector, configured to connect to the optical/electrical hybrid male connector provided in the first aspect or the first to seventh embodiments of the first aspect, the female connector has a coupling interface, at least two female accommodating channels are disposed on the coupling interface, the female accommodating channels are used to mount an optical connector, at least one female electrical connector is further disposed on the coupling interface, and each female electrical connector is located between the two female accommodating channels.

The female electrical connector is configured to accommodate a male electrical connector at a male connector of an optical/electrical hybrid connector system, to implement an electrical connection between the female electrical connector and the male electrical connector.

In the female connector provided in this application, each female electrical connector is located between two female accommodating channels. This effectively utilizes idle space between the two female accommodating channels, and does not need to occupy other space, thereby improving space utilization of the female connector.

According to the second aspect, in a first possible embodiment of the second aspect of this application, the female electrical connector includes a female insertion part and a female contact terminal disposed on the female insertion part, the female insertion part is configured to be inserted into an insertion slot of the male electrical connector, and the female contact terminal is configured to electrically connect to the male contact terminal.

In a process of inserting the optical/electrical hybrid male connector into the female connector, an insertion slot on a male insertion part guides and limits the female insertion part, thereby facilitating assembly of the optical/electrical hybrid male connector and the female connector.

According to the second aspect or the first possible embodiment of the second aspect of this application, in a second possible embodiment of the second aspect of this application, the female accommodating channel extends in a first direction, the at least two female accommodating channels are arranged in a second direction, the female insertion part includes a third side wall and a fourth side wall, the third side wall and the fourth side wall are oppositely disposed in a third direction, any two of the first direction, the second direction, and the third direction are orthogonal to each other, one female contact terminal is disposed on the third side wall, and the other female contact terminal is disposed on the fourth side wall.

The two female contact terminals are disposed on the inner wall of the female insertion part in the third direction (that is, a thickness direction of the female connector), and do not occupy space of an arrangement direction of the female accommodating channels (that is, a transverse direction of the female connector), and the female contact terminal and the optical connector do not interfere with each other or affect each other. In other words, the female contact terminal effectively uses idle space of the female connector in the third direction, further improves space utilization of the female connector, and effectively reduces a volume of the female connector, thereby facilitating miniaturization development of the female connector.

According to the second aspect or the first and the second possible embodiments of the second aspect of this application, in a third possible embodiment of the second aspect of this application, a female latch is disposed on an inner wall of the female accommodating channel, and is configured to latch to the optical connector mounted on the female accommodating channel, for locking, thereby improving connection stability between the optical connector and the female connector.

According to the second aspect or the first to the third possible embodiments of the second aspect of this application, in a fourth possible embodiment of the second aspect of this application, there are two female accommodating channels, to reduce tolerance and precision during manufacturing of the optical/electrical hybrid female connector, thereby reducing production costs and production difficulty of the optical/electrical hybrid female connector.

According to the second aspect or the first to the fourth possible embodiments of the second aspect of this application, in a fifth possible embodiment of the second aspect of this application, the female connector is an optical module.

According to the second aspect or the first to the fifth possible embodiments of the second aspect of this application, in a sixth possible embodiment of the second aspect of this application, the female connector is an optical fiber adapter, the female connector includes a first end and a second end that are oppositely disposed, the coupling interface is disposed at both the first end and the second end, and a female accommodating channel of the first end one-to-one corresponds to and communicates with a female accommodating channel of the second end.

According to the second aspect or the first to the sixth possible embodiments of the second aspect of this application, in a seventh possible embodiment of the second aspect of this application, a female separator is formed between the two female accommodating channels, the female separator is provided with an accommodating slot, the female electrical connector further includes a body, the female insertion part is protrudedly disposed on the body, and the body is slidably connected to an inner wall of the accommodating slot, thereby facilitating assembly of the female connector.

According to a third aspect, this application provides an optical/electrical hybrid connector system, including the optical/electrical hybrid male connector provided in the first aspect or the first to the seventh possible embodiments of the first aspect and the female connector according to the second aspect or the first to the seventh possible embodiments of the second aspect.

According to a fourth aspect, this application provides an electronic device, including the optical/electrical hybrid male connector according to the first aspect or the possible embodiments of the first aspect.

According to a fifth aspect, this application provides an electronic device, including the female connector according to the second aspect or the possible embodiments of the second aspect. The electronic device in the fourth aspect and the fifth aspect may be various devices based on optical/electrical communication, including but not limited to a switch, a router, a server, a base station, and the like.

DESCRIPTION OF EMBODIMENTS

Figure 1:
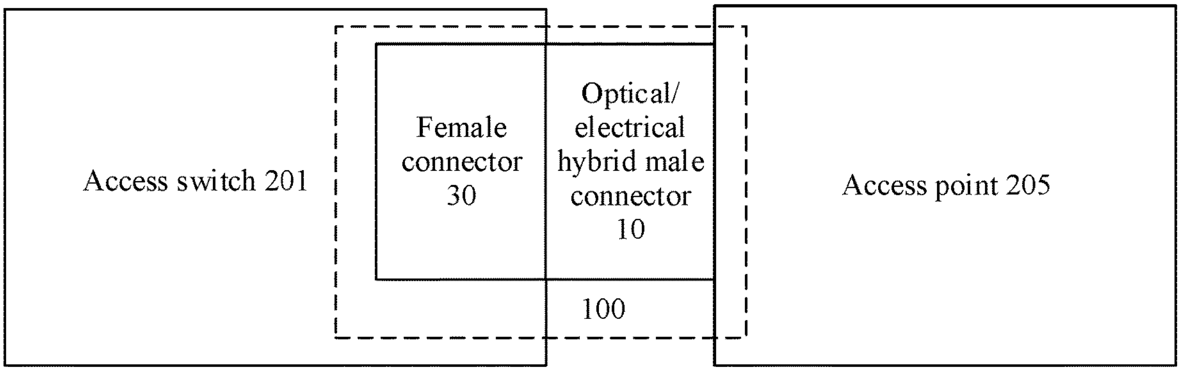
FIG. 1 is a schematic diagram of an application scenario of an optical/electrical hybrid connector system according to this application.

To make the objectives, technical solutions, and advantages of this application clearer, the following further describes this application in detail with reference to the accompanying drawings.

It should be understood that expressions such as "include" and "may include" that may be used in this application indicate existence of the disclosed function, operation, or constituent element, and do not limit one or more additional functions, operations, and constituent elements. In this application, terms such as "include" and/or "have" may be construed as a particular characteristic, quantity, operation, constituent element, or component, or a combination thereof, but cannot be construed as excluding the existence or possible addition of one or more other characteristics, quantities, operations, constituent elements, or components, or combinations thereof.

In addition, in this application, the expression "and/or" includes any and all combinations of words listed in association. For example, the expression "A and/or B" may include A, may include B, or may include both A and B.

In this application, expressions including ordinal numbers such as "first" and "second" may modify elements. However, such elements are not limited by the expressions. For example, the expressions do not limit the order and/or importance of the elements. The expression is used only to distinguish one element from another. For example, first user equipment and second user equipment indicate different user equipment, although both the first user equipment and the second user equipment are user equipment. Similarly, without departing from the scope of this application, a first element may be referred to as a second element, and similarly, a second element may also be referred to as a first element.

When a component is described as "connected to" or "access" another component, it should be understood that the component is directly connected to or directly accesses the another component, or a further component may alternatively exist between the component and the another component. In addition, when a component is described as "directly connected to" or "directly access" another component, it should be understood that no other component exists between them.

An access point refers to a device used by a user terminal of a wireless local area network (WLAN) to access a network. To make an access switch power supply to an access point while transmitting an optical signal to the access point and to meet an onsite routing process requirement, an optical/electrical hybrid cable is usually used. Therefore, the access switch may cooperate with an optical connection apparatus to transmit the optical signal to the access point, and the access switch may cooperate with an electrical connection apparatus to supply power to the access point. The optical connection apparatus and the electrical connection apparatus are separately disposed, which easily causes large occupied space, and causes large areas occupied by an optical interface and an electrical interface on a coupling interface of the access switch. This is not conducive to miniaturization development of a device such as the access switch and a system.

In view of this, refer to FIG. 1. This application provides an optical/electrical hybrid connector system 100, configured to connect an access switch 201 to an access point 205.

Figure 2:
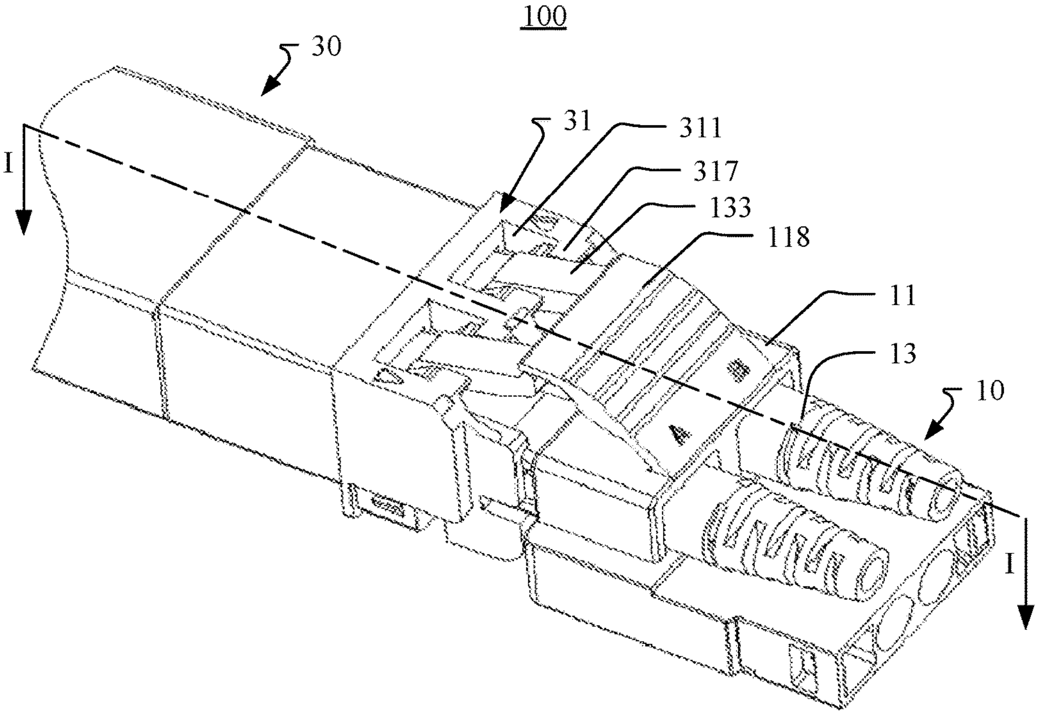
FIG. 2 is a schematic three-dimensional assembly diagram of an optical/electrical hybrid connector system according to a first embodiment of this application.
Figure 3:
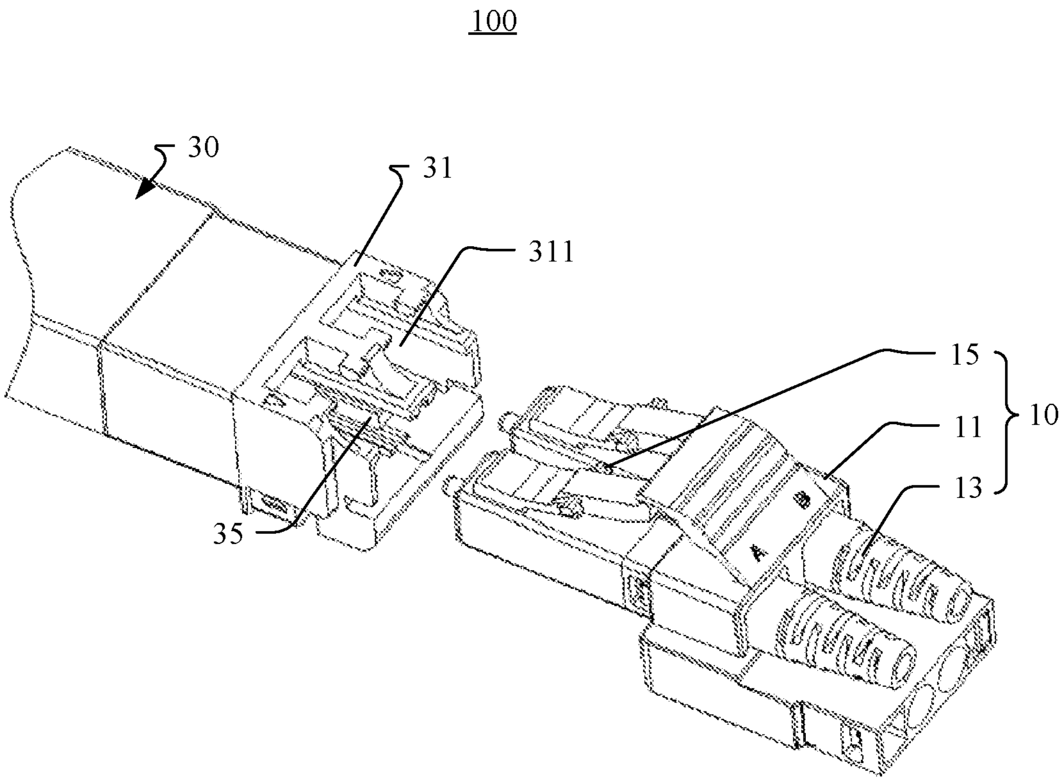
FIG. 3 is a schematic three-dimensional exploded view of the optical/electrical hybrid connector system shown in FIG. 2.

Refer to FIG. 2 and FIG. 3. The optical/electrical hybrid connector system 100 includes an optical/electrical hybrid male connector 10 and a female connector 30 that cooperates with the optical/electrical hybrid male connector 10 in an insertion manner. In this embodiment, the female connector 30 is an optical module disposed on the access switch 201, and the female connector 30 is connected to the access point 205 by using the optical/electrical hybrid male connector 10, to implement optical signal transmission and an electrical connection between the female connector 30 and the access point 205. In other words, when an optical signal is transmitted between the female connector 30 and the access point 205, the female connector 30 can also supply power to the access point 205 by using the optical/electrical hybrid male connector 10.

Figure 4:
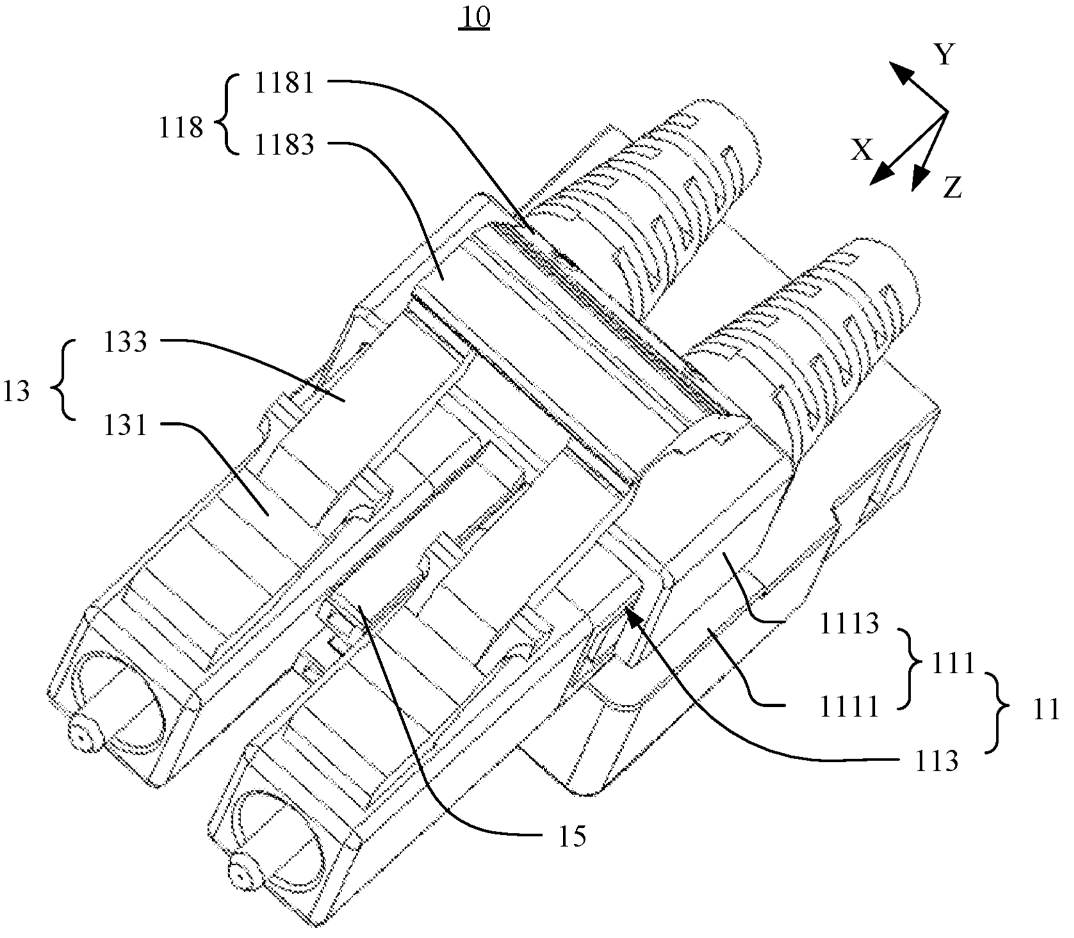
FIG. 4 is a schematic three-dimensional diagram of an optical/electrical hybrid male connector of the optical/electrical hybrid connector system shown in FIG. 2.
Figure 5:
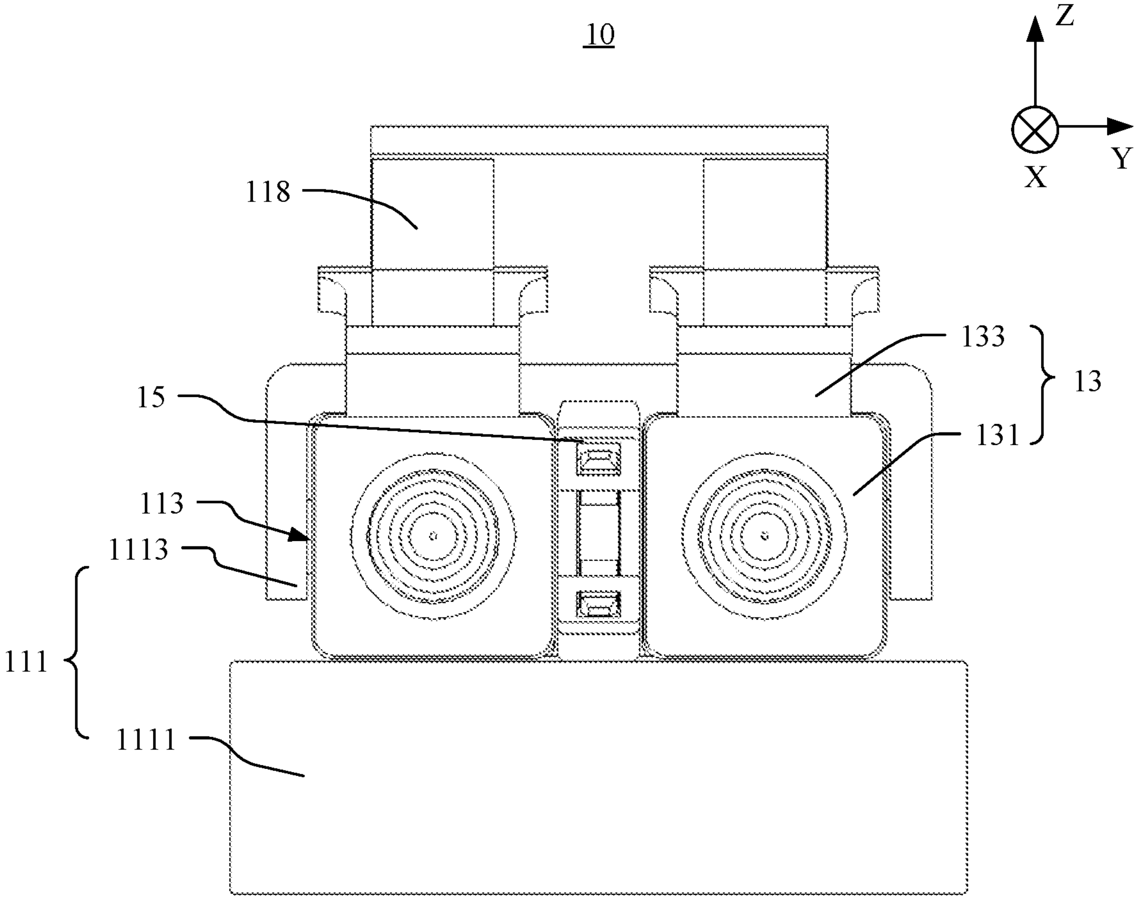
FIG. 5 is a front view of the optical/electrical hybrid male connector shown in FIG. 4.

Refer to FIG. 4 and FIG. 5. The optical/electrical hybrid male connector 10 includes a male base 11, two optical connectors 13, and a male electrical connector 15. The male base 11 includes a base body 111 and two male accommodating channels 113 disposed on the base body 111. The two male accommodating channels 113 one-to-one correspond to the two optical connectors 13. Each optical connector 13 is mounted on one corresponding male accommodating channel 113, and is configured to transmit an optical signal. There are two male accommodating channels 113 on the male base 11, which can effectively reduce tolerance and precision of the optical/electrical hybrid male connector 10, and help reduce production difficulty and production costs of the optical/electrical hybrid male connector 10. In this embodiment, the optical connector 13 is an LC connector, and the male accommodating channel 113 adapts to the LC connector. The optical connector 13 uses a standard LC connector, so that an application range of the optical/electrical hybrid male connector 10 is increased.

Figure 6:
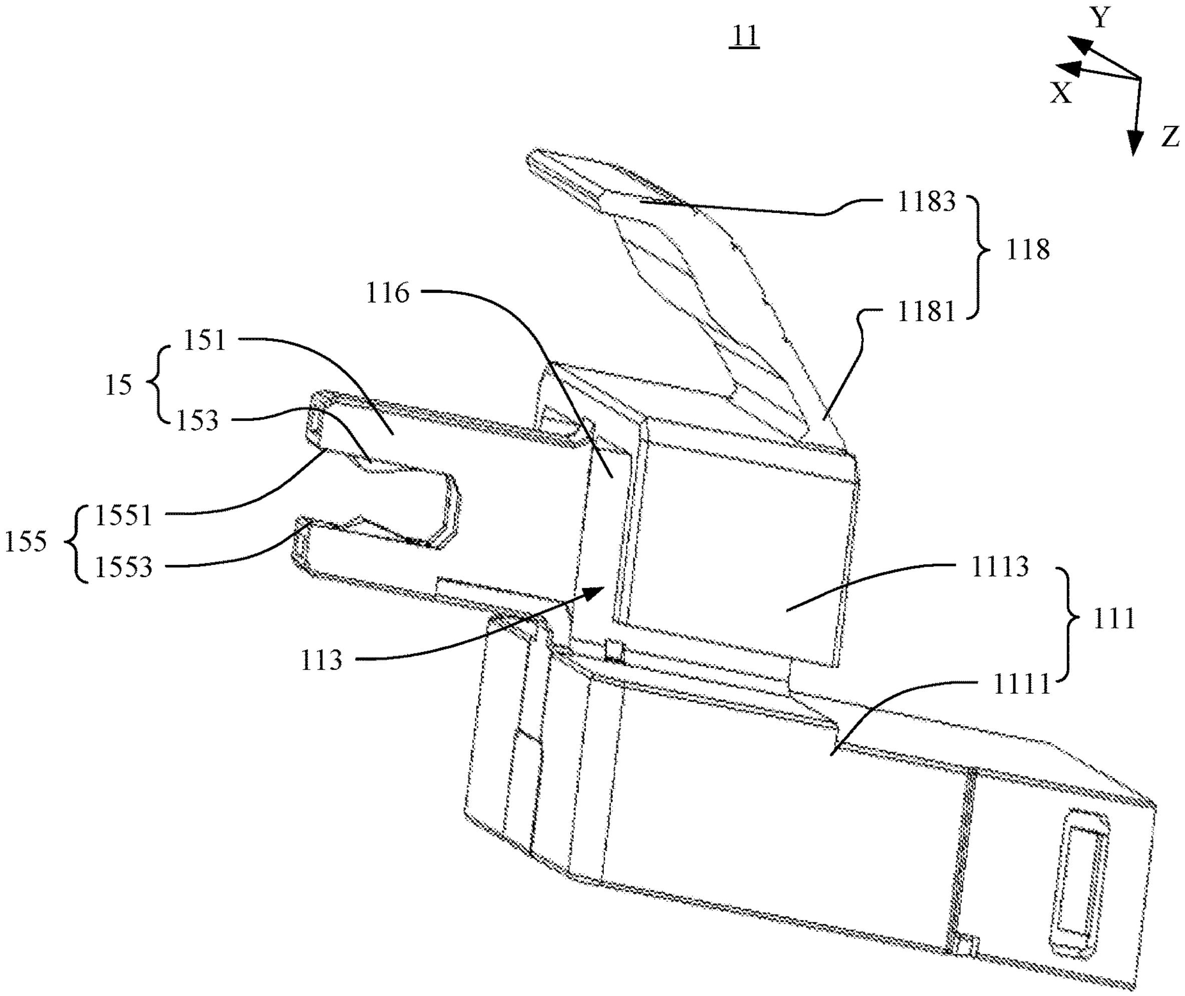
FIG. 6 is a schematic three-dimensional diagram of a male base of the optical/electrical hybrid male connector shown in FIG. 4.

The male electrical connector 15 is protrudedly disposed on the base body 111 and is located between the two optical connectors 13. The male electrical connector 15 is configured to be inserted into the female connector 30, to implement an electrical connection between the optical/electrical hybrid male connector 10 and the female connector 30. Refer to FIG. 6. A male separator 116 is formed between the two male accommodating channels 113 on the male base 11, so that the two male accommodating channels 113 are spaced. The male electrical connector 15 is protrudedly disposed on an end face of the male separator 116, so that the male electrical connector 15 is located between the two optical connectors 13. It may be understood that this application is not limited to that the two male accommodating channels 113 are spaced by using the male separator 116. In another embodiment, the two male accommodating channels 113 may alternatively communicate with each other. In addition, this application is not limited to that the male electrical connector 15 is protrudedly disposed on the end face of the male separator 116 provided that the male electrical connector 15 is protrudedly disposed on the base body 111 and is located between the two optical connectors 13.

Because the optical connector 13 and the male electrical connector 15 are disposed on the optical/electrical hybrid male connector 10, the optical/electrical hybrid male connector 10 integrates the optical connector and the electrical connector as a whole, in other words, the optical/electrical hybrid male connector 10 has an optical interface and is compatible with an electrical interface, to implement synchronous insertion and removal of the optical connector and the electrical connector, thereby facilitating assembly and disassembly of the optical/electrical hybrid male connector 10 and the female connector 30. In addition, the male electrical connector 15 is protrudedly disposed on the base body 111 and is located between the two optical connectors 13, so that idle space between the two optical connectors 13 of the optical/electrical hybrid male connector 10 is effectively used without occupying other space, thereby improving space utilization of the optical/electrical hybrid male connector 10.

It may be understood that a quantity of male accommodating channels 113 is not limited to two, the quantity of male accommodating channels 113 may be more than two, a quantity of optical connectors 13 is not limited to two, the quantity of optical connectors 13 may be more than two, the at least two male accommodating channels 113 one-to-one correspond to the at least two optical connectors 13, and each optical connector 13 is mounted on one corresponding male accommodating channel 113. There may be at least one male electrical connector 15, and each male electrical connector 15 is protrudedly disposed on the base body 111 and is located between the two male accommodating channels 113.

Refer to FIG. 6. The base body 111 includes a support part 1111 and a connection part 1113 that is protrudedly disposed on the support part 1111. The male electrical connector 15 includes a male insertion part 151 and a male contact terminal 153. An insertion slot 155 is provided on an end face that is of the male insertion part 151 and that faces away from the support part 1111 of the base body 111. It may be understood that there may be more than one connection part 1113.

In this embodiment, the male accommodating channel 113 extends in a first direction (for example, an X direction shown in FIG. 6). The first direction is an axial direction of the optical/electrical hybrid male connector 10. The two male accommodating channels 113 are arranged in a second direction (for example, a Y direction shown in FIG. 6). The two optical connectors 13 and the male electrical connector 15 are arranged in the second direction, and the male electrical connector 15 and the male separator 116 are arranged in the first direction. There are two male contact terminals 153 on each male electrical connector 15. An inner wall of the insertion slot 155 includes a first side wall 1551 and a second side wall 1553. The first side wall 1551 and the second side wall 1553 are oppositely disposed in a third direction (for example, a Z direction shown in FIG. 6), and any two of the first direction, the second direction, and the third direction are orthogonal to each other. One male contact terminal 153 is disposed on the first side wall 1551, and the other male contact terminal 153 is disposed on the second side wall 1553.

Because the two male contact terminals 153 are disposed on the inner wall of the insertion slot 155 in the third direction (that is, a thickness direction of the optical/electrical hybrid male connector 10), and do not occupy space in an arrangement direction of the male accommodating channels 113 (that is, a transverse direction of the optical/electrical hybrid male connector 10), the male contact terminal 153 and the optical connector 13 do not interfere with each other or affect each other. In other words, the male contact terminal 153 effectively uses idle space of the male base 11 in the third direction, space utilization of the optical/electrical hybrid male connector 10 is further improved, and a volume of the optical/electrical hybrid male connector 10 is effectively reduced, thereby facilitating miniaturization development of the optical/electrical hybrid male connector 10.

Figure 7:
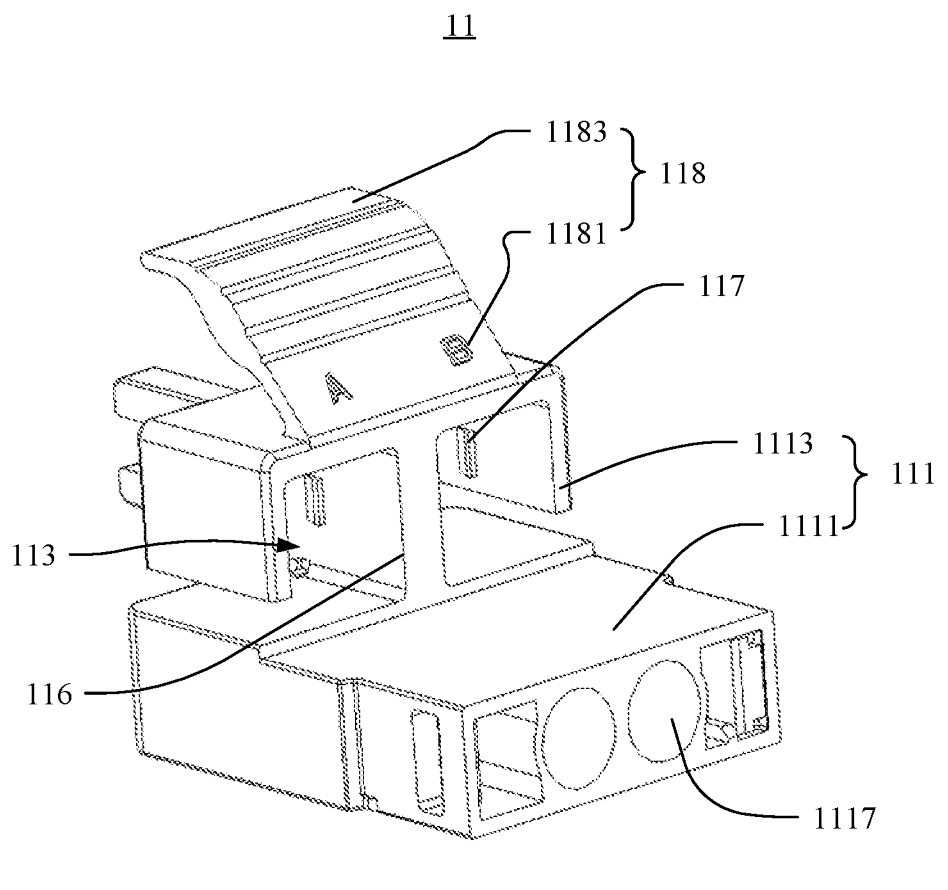
FIG. 7 is a schematic diagram from another angle of view of the male base shown in FIG. 6.

Refer to FIG. 7. A male cable routing structure 1117 electrically connected to the male contact terminal 153 is disposed on the support part 1111. The male cable routing structure 1117 is configured to electrically connect to another electrical connector (for example, a cable) or apparatus. In this embodiment, the male insertion part 151 is an insulator. For example, the insulator includes plastic, and a line for implementing an electrical connection between the male cable routing structure 1117 and the male contact terminal 153 is disposed in the base body 111.

The optical connector 13 may be detachably mounted on the male accommodating channel 113. A male clamping protrusion 117 is disposed on an inner wall of the male accommodating channel 113.

Refer to FIG. 4 again. The optical connector 13 includes a body 131 and a connection latch 133 that is protrudedly disposed on the body 131. The male clamping protrusion 117 is latched to a side wall of the body 131 mounted in the male accommodating channel 113, to facilitate assembly and disassembly between the optical connector 13 and the male base 11. It may be understood that a connection manner of the optical connector 13 and the male accommodating channel 113 is not limited. For example, the optical connector 13 and the inner wall of the male accommodating channel 113 may be connected together in a manner of screw connection, to enhance connection stability between the optical connector 13 and the inner wall of the male accommodating channel 113.

The male base 11 further includes a male latch 118, the male latch 118 includes a fastened end 1181 and a pre-pressed end 1183 that are oppositely disposed, and the fastened end 1181 is fastenedly connected to a top surface that is of the connection part 1113 and that faces away from the support part 1111. The optical connector 13 is provided with the connection latch 133. The pre-pressed end 1183 abuts against the connection latch 133 of the optical connector 13, and the male latch 118 is configured to pre-press the optical connector 13, to improve connection stability between the optical connector 13 and the male accommodating channel 113. In addition, the male cable routing structure 1117 is disposed at the bottom of the base body 111, and is disposed opposite to the male latch 118, so that space of the male base 11 is maximized, and the male cable routing structure 1117 does not occupy space outside the male base 11, and does not affect insertion and unlocking.

Figure 8:
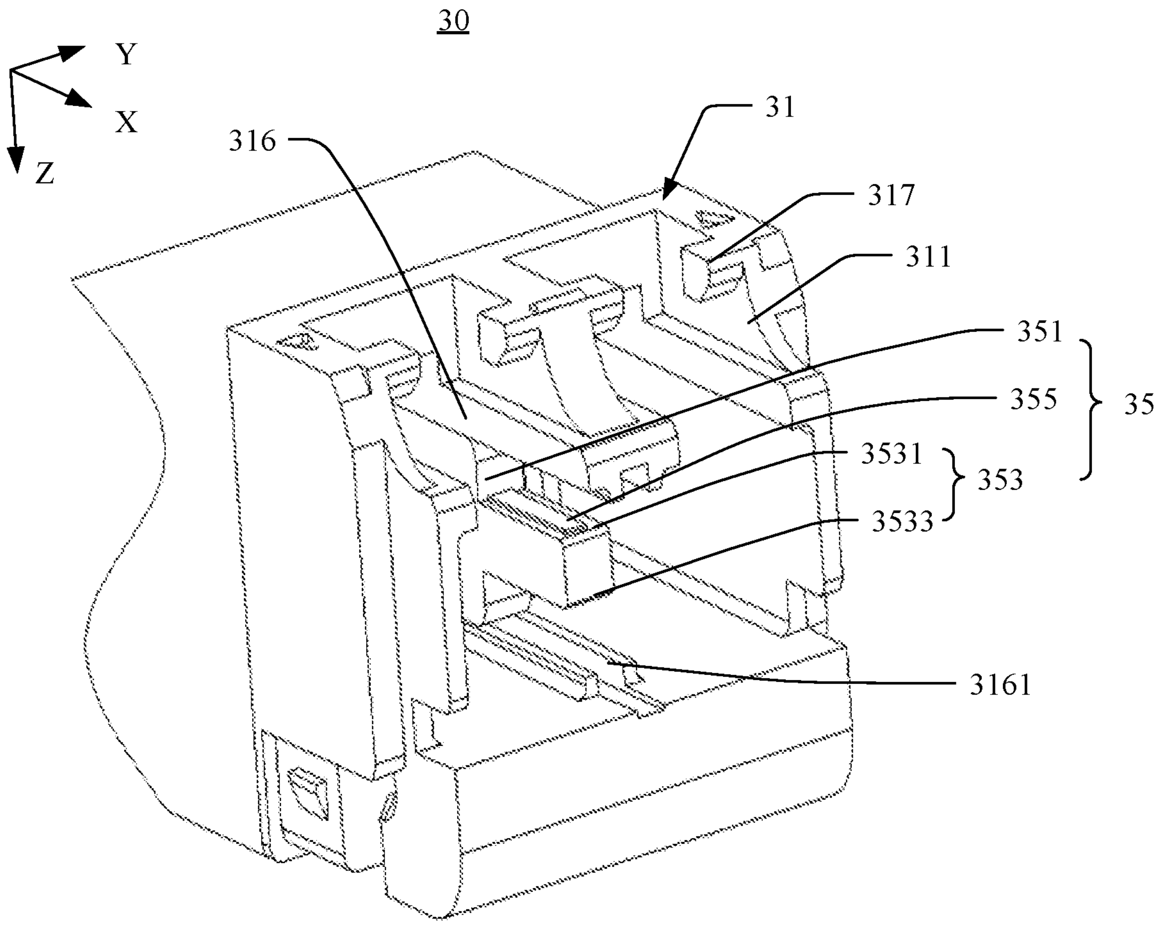
FIG. 8 is a schematic three-dimensional diagram of a female connector of the optical/electrical hybrid connector system shown in FIG. 4.

Refer to FIG. 8. The female connector 30 has a coupling interface 31. The coupling interface 31 is provided with two female accommodating channels 311. The female accommodating channel 311 is used to mount the optical connector 13, the coupling interface 31 is further provided with a female electrical connector 35, and the female electrical connector 35 is located between the two female accommodating channels 311.

More specifically, a female separator 316 is formed between the two female accommodating channels 311. The female separator 316 is provided with an accommodating slot 3161, configured to accommodate the female electrical connector 35 and the male electrical connector 15. The female electrical connector 35 is accommodated in the accommodating slot 3161. The female electrical connector 35 includes a body 351, a female insertion part 353 that is protrudedly disposed on the body 351, and a female contact terminal 355 disposed on the female insertion part 353. The female electrical connector 35 and the female separator 316 are separately disposed, so that preparation difficulty and generation costs of the female connector 30 are reduced. In this embodiment, the male contact terminal 153 is a spring terminal, to elastically abut against the female contact terminal 355 when the male contact terminal 153 is in contact with the female contact terminal 355, thereby improving contact stability between the male contact terminal 153 and the female contact terminal 355.

In this embodiment, the body 351 is slidably connected to an inner wall of the accommodating slot 3161, thereby facilitating assembly of the female electrical connector 35 on the female connector 30. A guide rail is disposed on the inner wall of the accommodating slot 3161, and a guide structure cooperating with the guide rail 3162 is disposed on the body 351. The accommodating slot 3161 penetrates through the female separator 316, so that the two female accommodating channels 311 are communicated with each other, to maximize use of idle space between the two female accommodating channels 311. It may be understood that the body 351 is not limited to being slidably connected to the inner wall of the accommodating slot 3161. For example, the body 351 is disposed on the female separator 316 in a latching manner provided that the body 351 can be fastened on the female separator 316.

The female accommodating channel 311 extends in a first direction (for example, an X direction shown in FIG. 8), the two female accommodating channels 311 are arranged in a second direction (for example, a Y direction shown in FIG. 8), the female insertion part 353 extends in the first direction, the female insertion part 353 includes a third side wall 3531 and a fourth side wall 3533, and the third side wall 3531 and the fourth side wall 3553 oppositely disposed in a third direction (for example, a Z direction shown in FIG. 8). One female contact terminal 355 is disposed on the third side wall 3531, and the other female contact terminal 355 is disposed on the fourth side wall 3533. The two female contact terminals 355 are disposed on the inner wall of the female insertion part 353 in the third direction (that is, a thickness direction of the female connector 30), and do not occupy space of an arrangement direction of the female accommodating channels 311 (that is, a transverse direction of the female connector 30), and the female contact terminal 355 and the optical connector 13 do not interfere with each other or affect each other. In other words, the female contact terminal 355 effectively uses idle space of the female connector 30 in the third direction, further improves space utilization of the female connector 30, and effectively reduces a volume of the female connector 30, thereby facilitating miniaturization development of the female connector 30.

A female latch 317 is disposed on an inner wall of the female accommodating channel 311, and is configured to perform a latched connection with the connection latch 133 of the optical connector 13 that is penetratedly mounted on the female accommodating channel 311.

It may be understood that a quantity of female accommodating channels 311 is not limited to two, and the quantity of female accommodating channels 311 may be more than two. At least two female accommodating channels 311 one-to-one correspond to at least two optical connectors 13, and each optical connector 13 is mounted on one corresponding female accommodating channel 311. There may be at least one female electrical connector 35, and each female electrical connector 35 is disposed on the female connector 30 and located between the two female accommodating channels 311.

Refer to FIG. 2 again. The male latch 118 on the male base 11 pre-presses the connection latch 133 of the optical connector 13. After the optical/electrical hybrid male connector 10 is inserted into the coupling interface 31 of the female connector 30, the optical connector 13 is penetratedly disposed on the corresponding female accommodating channel 311, and the female latch 317 is locked together with the connection latch 133 of the optical connector 13, so that an optical signal can be exchanged between the optical/electrical hybrid connector 10 and the female connector 30.

Figure 9:
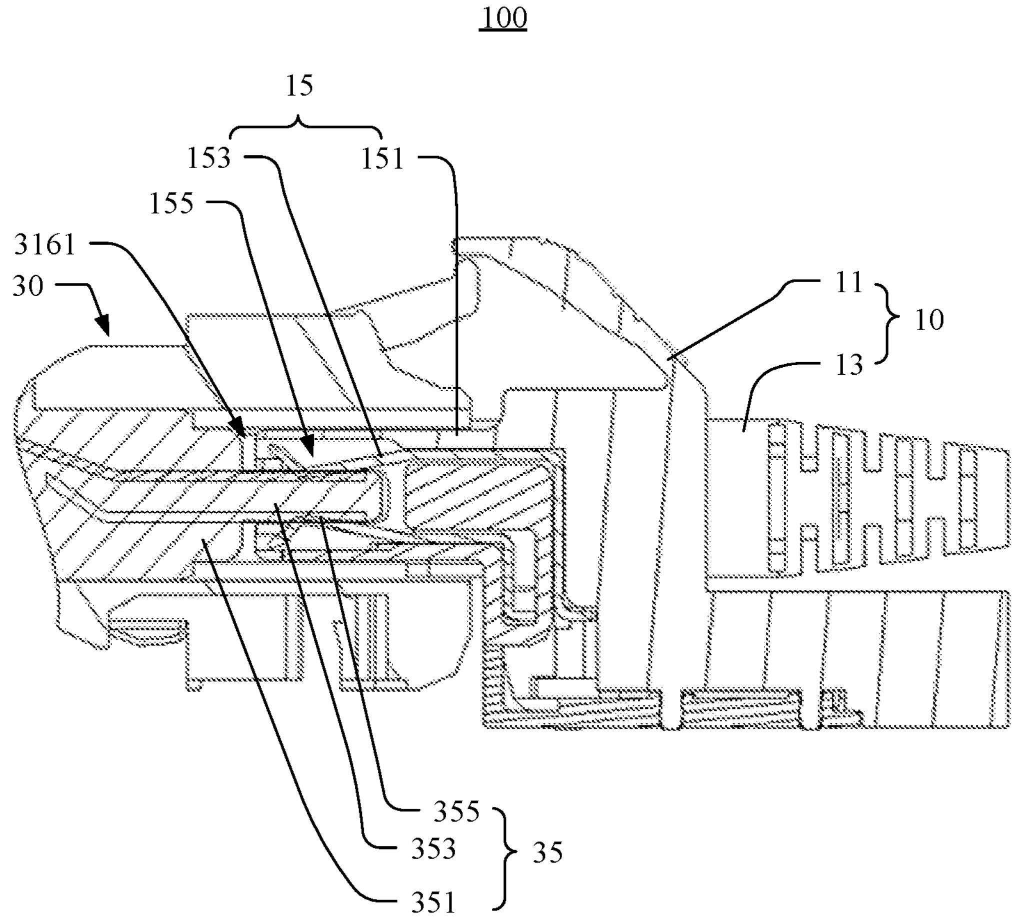
FIG. 9 is a sectional view of I-I along a line of the optical/electrical hybrid connector system shown in FIG. 2.

Refer to FIG. 9. When the optical/electrical hybrid male connector 10 is inserted into the female connector 30, the optical connector 13 is penetratedly disposed on the corresponding female accommodating channel 311, and the male electrical connector 15 slides into the accommodating slot 3161 and is coupled to the female electrical connector 35. An outer wall of the male insertion part 151 is matched with the inner wall of the accommodating slot 3161, the female insertion part 353 is inserted into the insertion slot 155, the female insertion part 353, the body 351, and the male separator 116 are arranged in the first direction, the first side wall 1551 and the third side wall 3531 are disposed face to face, and the second side wall 1553 and the fourth side wall 3533 are disposed face to face. The female contact terminal 355 is electrically in contact with a corresponding male contact terminal 153, to implement an electrical connection between the female electrical connector 35 and the male electrical connector 15. The accommodating slot 3161 of the female connector 30 provides coupling space for the male electrical connector 15 and the female electrical connector 35, and does not occupy other space of the female connector 30, thereby facilitating miniaturization of the female connector 30.

When the optical/electrical hybrid male connector 10 is to be unlocked from the female connector 30, the male latch 118 of the male base 11 is pressed, and the male latch 118 is driven to be detached from the female latch 317 of the female connector 30, to complete an unlocking action.

It may be understood that a position at which the male contact terminal 153 is disposed on the male electrical connector 15 is not limited, and a position at which the female contact terminal 355 is disposed on the female electrical connector 35 is not limited. The male contact terminal 153 can be electrically in contact with the female contact terminal 355 provided that the male electrical connector 15 is electrically connected to the female electrical connector 35.

It may be understood that, the female separator 316 may be omitted, and the body 351 is disposed between the two female accommodating channels 311 to serve as a separator. The body 351 may be omitted, and the female insertion part 353 is protrudedly disposed on the female separator 316. A manner of disposing the female electrical connector 35 on the female connector 30 is not limited. For example, the female electrical connector 35 may also be disposed with the female separator 316 as a whole.

It may be understood that a structure of the male electrical connector 15 is not limited, and a structure of the female electrical connector 35 is not limited. For example, the insertion slot 155 may be omitted in the male insertion part 151 of the male electrical connector 15, the male contact terminal 153 is disposed on the outer wall of the male insertion part 151, the female electrical connector 35 may omit the female insertion part 353, and the female contact terminal 355 is disposed on the inner wall of the accommodating slot 3161 provided that the male electrical connector 15 and the female electrical connector 35 can be coupled to implement an electrical connection.

Figure 10:
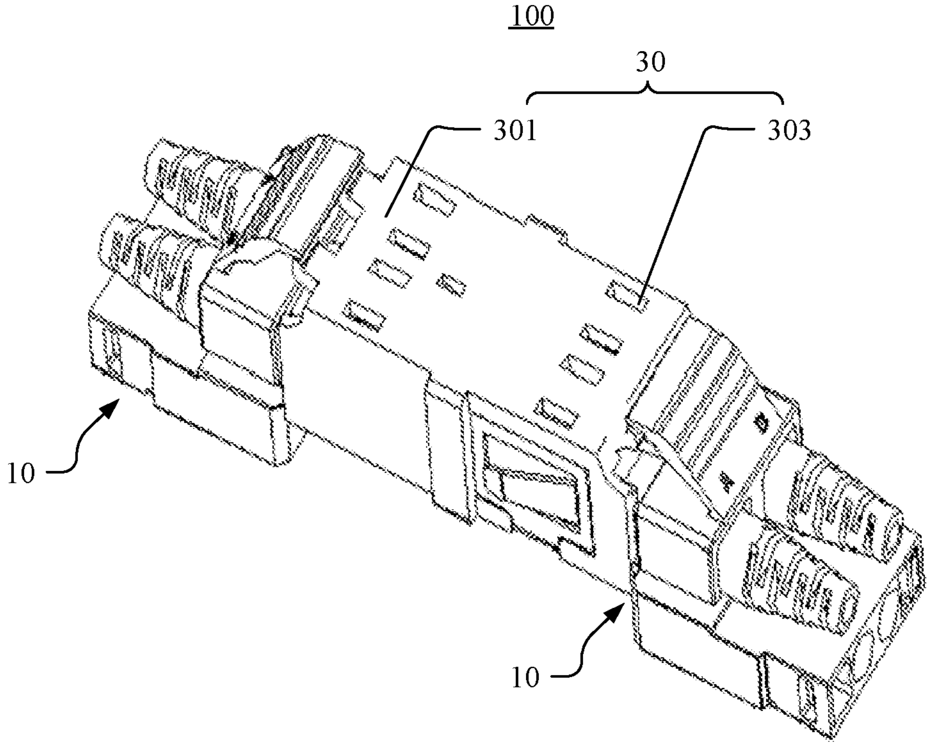
FIG. 10 is a schematic three-dimensional assembly diagram of an optical/electrical hybrid connector system according to a second embodiment of this application.
Figure 11:
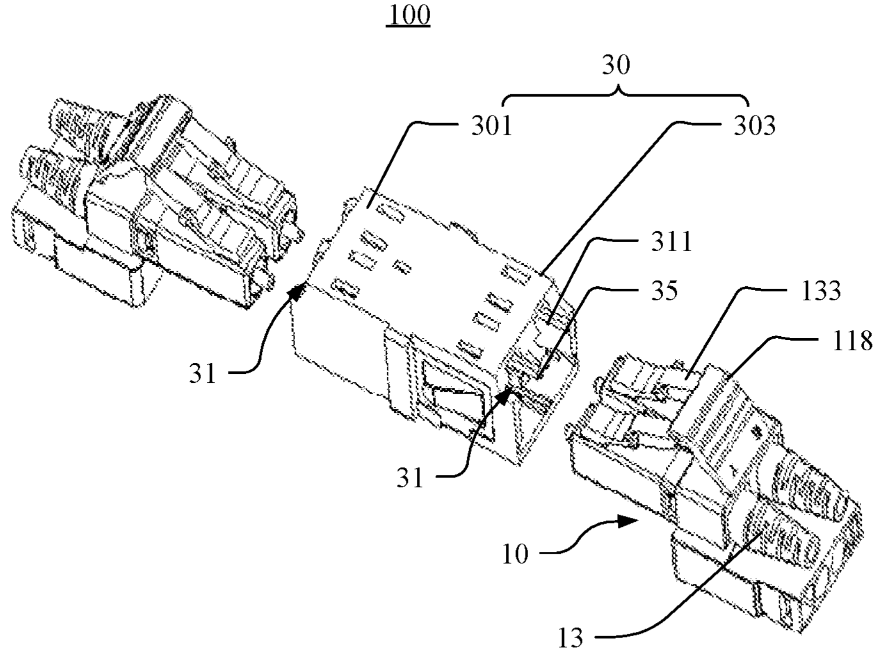
FIG. 11 is a schematic three-dimensional exploded view of the optical/electrical hybrid connector system shown in FIG. 10.

Refer to FIG. 10 and FIG. 11. A difference between the optical/electrical hybrid connector system 100 provided in the second embodiment of this application and the optical/electrical hybrid connector system 100 provided in the first embodiment lies in that the female connector 30 is an optical fiber adapter. Both ends of the optical fiber adapter may be coupled to the optical/electrical hybrid male connector 10, to implement conversion between different interfaces.

Figure 12:
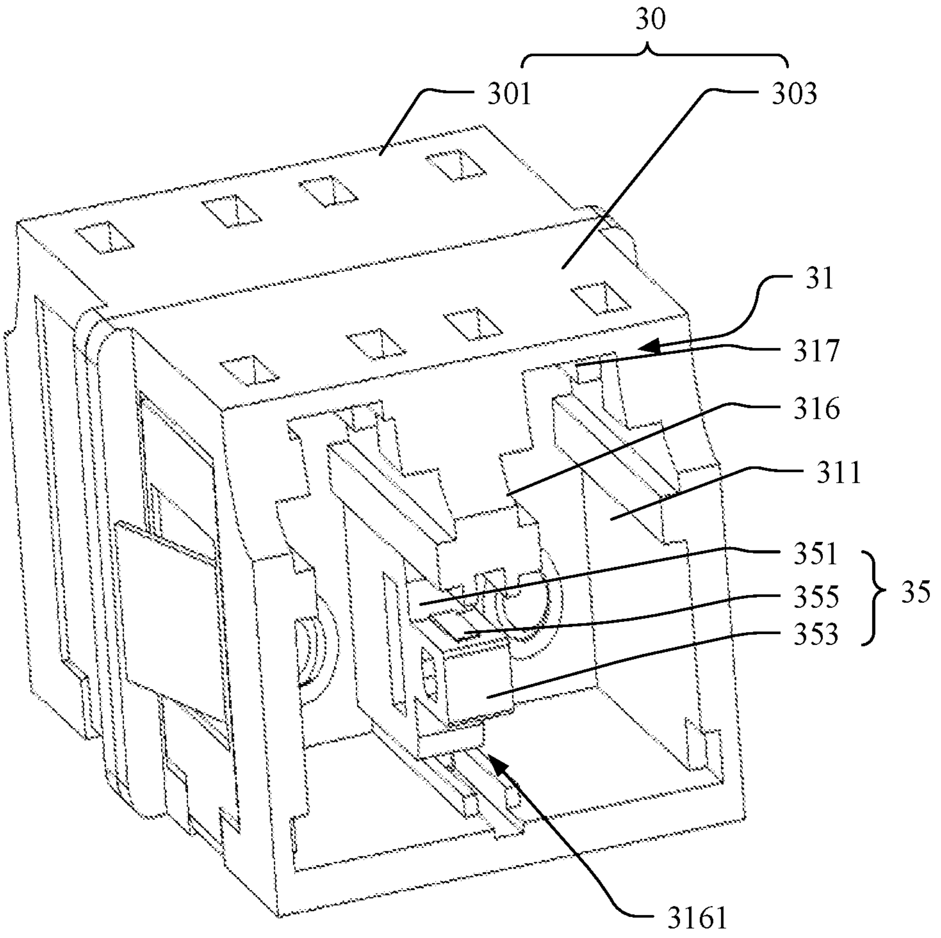
FIG. 12 is a schematic three-dimensional diagram of a female connector of the optical/electrical hybrid connector system shown in FIG. 10.
Figure 13:
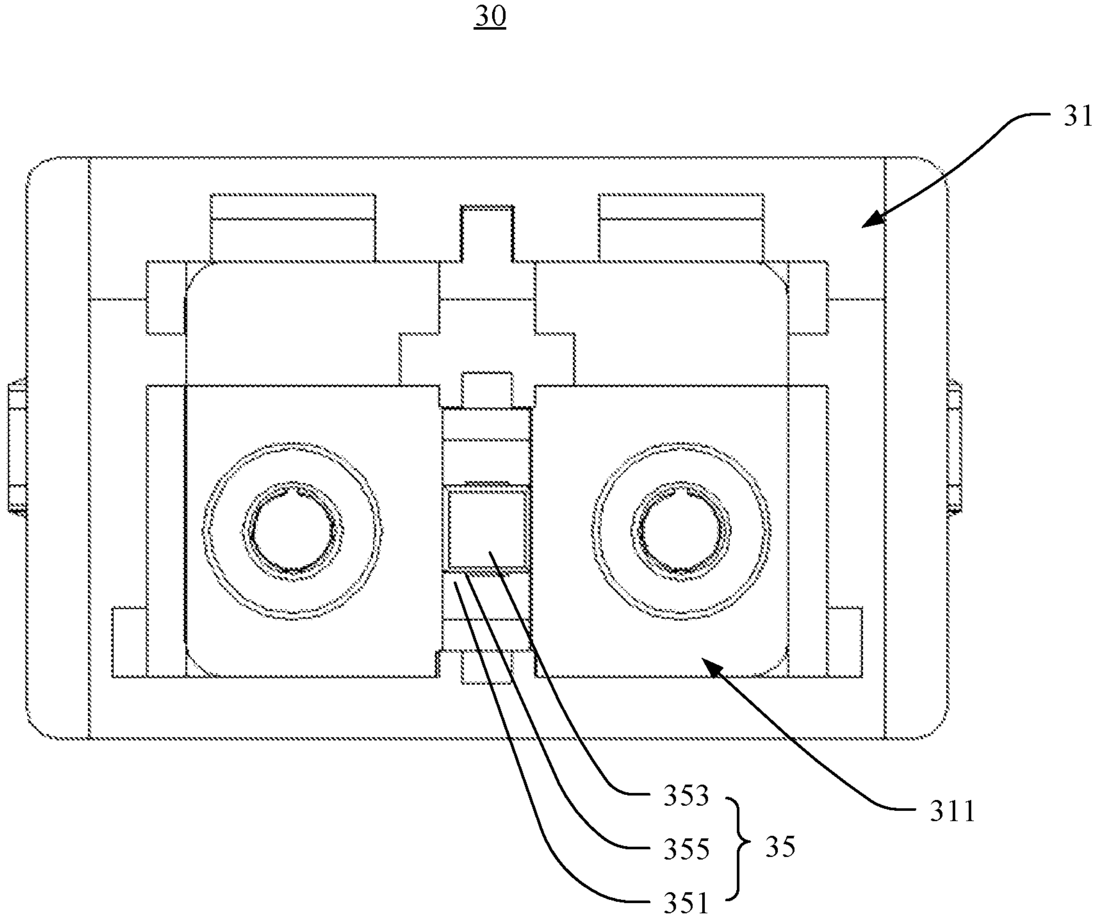
FIG. 13 is a front view of the female connector shown in FIG. 12.

Specifically, with reference to FIG. 12 and FIG. 13, the female connector 30 includes a first end 301 and a second end 303 that are oppositely disposed. Both the first end 301 and the second end 303 include a coupling interface 31. A female accommodating channel 311 of the first end 301 one-to-one corresponds to and communicates with a female accommodating channel 311 of the second end 303. Two female accommodating channels 311 are disposed on the female connector 30, a female separator 316 is formed between the two female accommodating channels 311, and an accommodating slot 3161 is disposed on the female separator 316. The female connector 30 is further provided with an electrical connector 35, and the electrical connector 35 is accommodated in the accommodating slot 3161. In other words, the electrical connector 35 is located between the two female accommodating channels 311. The female electrical connector 35 includes a body 351, a female insertion part 353 that is protrudedly disposed on the body 351, and a female contact terminal 355 disposed on the female insertion part 353.

In this embodiment, both the coupling interface 31 of the first end 301 of the female connector 30 and the coupling interface 31 of the second end 303 of the female connector 30 are inserted with the optical/electrical hybrid male connector 10, to implement transfer. It may be understood that optical connectors 13 in the two optical/electrical hybrid male connectors 10 may be different types of optical connectors, and the female accommodating channel 311 of the first end 301 and the female accommodating channel 311 of the second end 303 are adaptive to sizes of corresponding optical connectors 13.

For example, the coupling interface 31 of the first end 301 of the female connector 30 is coupled to one optical/electrical hybrid male connector 10. In an insertion process, connection latches 133 of the two optical connectors 13 are separately locked together with a female latch 317 of the female connector 30, so that the optical/electrical hybrid male connector 10 is fastened to the female connector 30. During unlocking, a male latch 118 of a male base 11 is pressed, and the male latch 118 may be driven to be detached from the female latch 317 of the female connector 30, to complete an unlocking action.

Figure 14:
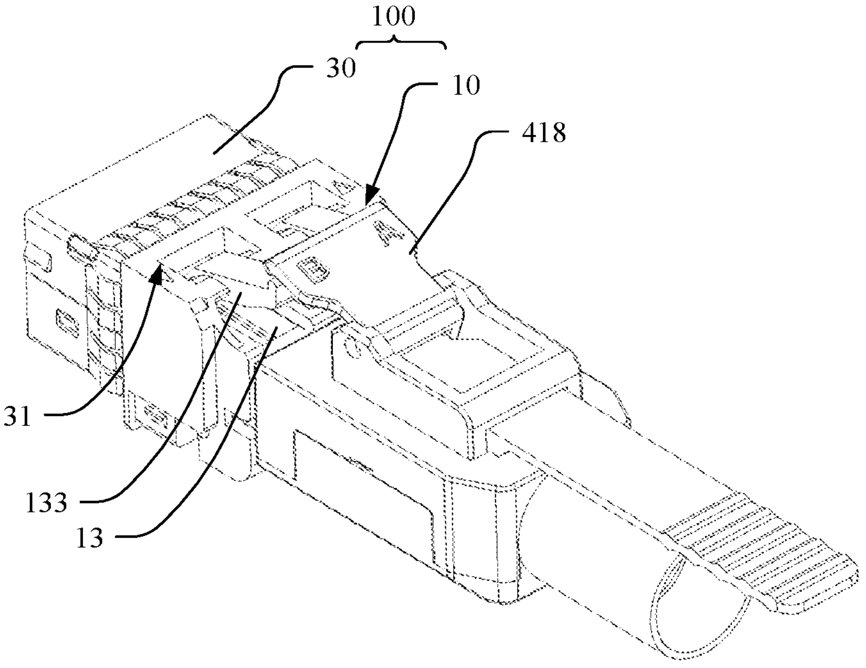
FIG. 14 is a schematic three-dimensional assembly diagram of an optical/electrical hybrid connector system according to a third embodiment of this application.
Figure 15:
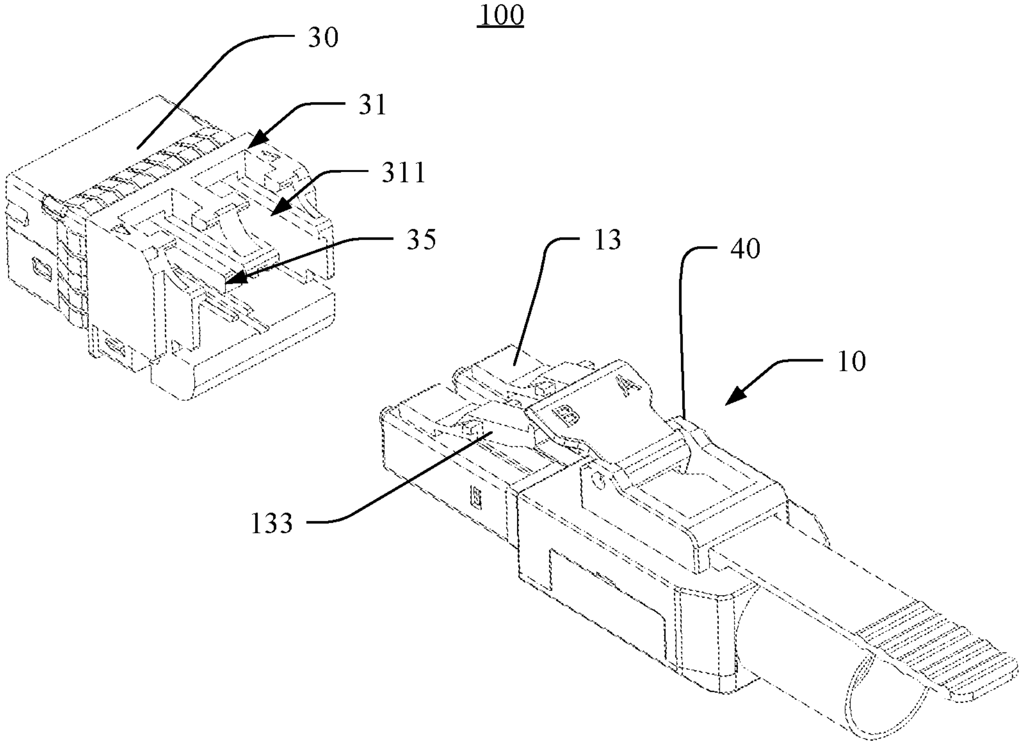
FIG. 15 is a schematic three-dimensional exploded view of the optical/electrical hybrid connector system shown in FIG. 14.

Refer to FIG. 14 and FIG. 15. A difference between the optical/electrical hybrid connector system 100 provided in the third embodiment of this application and the optical/electrical hybrid connector system 100 provided in the first embodiment lies in a structure of the optical/electrical hybrid male connector 10.

The optical/electrical hybrid connector system 100 includes an optical/electrical hybrid male connector 10 and a female connector 30 that cooperates with the optical/electrical hybrid male connector 10 in an insertion manner. In this embodiment, the female connector 30 is an optical module disposed on an access switch (not shown in the figure). The female connector 30 is connected to an access point (not shown in the figure) by using the optical/electrical hybrid male connector 10, to implement optical signal transmission and an electrical connection between the female connector 30 and the access point. In other words, when an optical signal is transmitted between the female connector 30 and the access point, the female connector can also supply power to the access point by using the optical/electrical hybrid male connector 10.

It may be understood that the female connector 30 is not limited to the optical module disposed on the access switch, and the female connector 30 may alternatively be another structure that can cooperate with the optical/electrical hybrid male connector 10. For example, the female connector 30 may be an optical fiber adapter. Both ends of the optical fiber adapter may be coupled to the optical/electrical hybrid male connector 10, to implement conversion between different interfaces.

Figure 16:
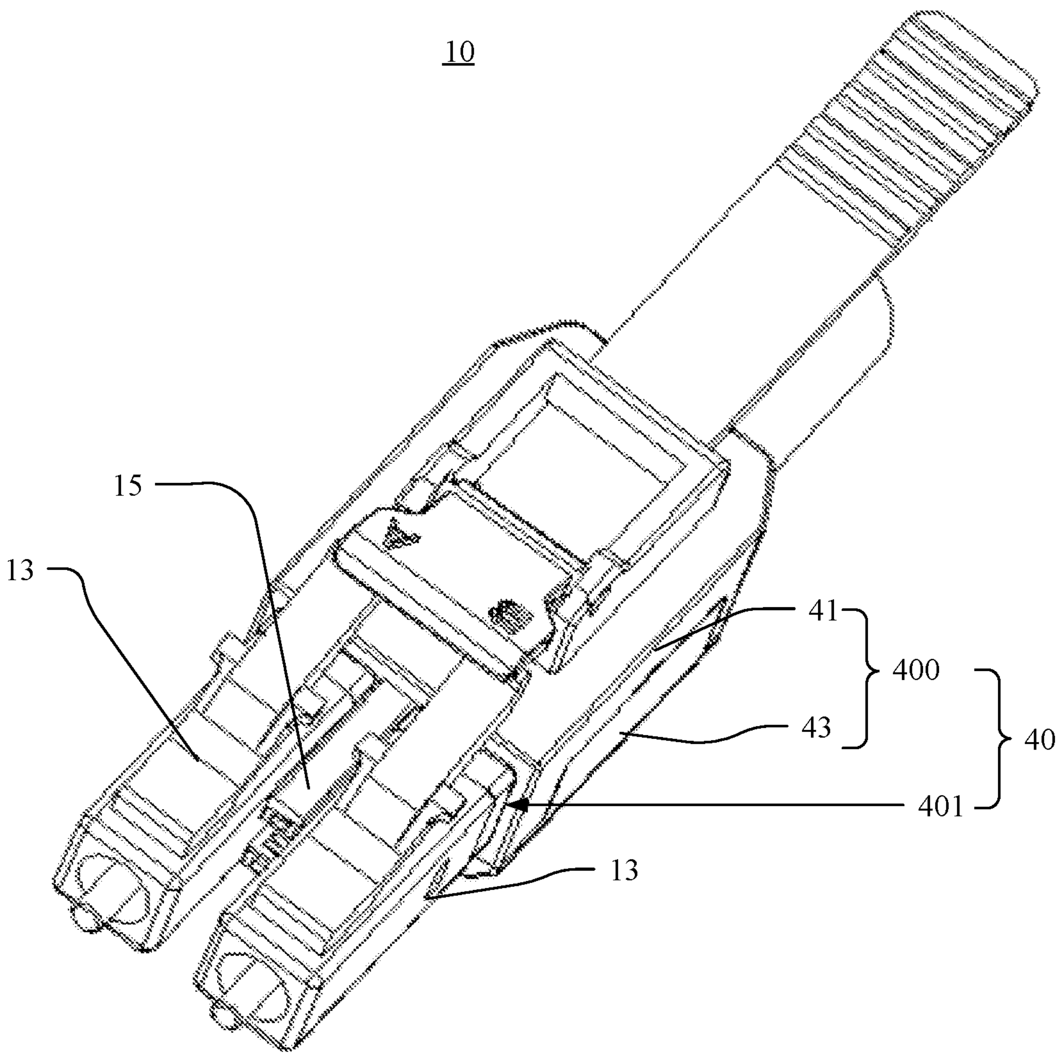
FIG. 16 is a schematic three-dimensional diagram of an optical/electrical hybrid male connector of the optical/electrical hybrid connector system shown in FIG. 14.

Refer to FIG. 16. The optical/electrical hybrid male connector 10 includes a male base 40, two optical connectors 13, and one male electrical connector 15. The two optical connectors 13 are mounted on the male base 40, and are configured to transmit an optical signal. The male electrical connector 15 is mounted on the male base 40, and is configured to implement an electrical connection between the female connector 30 and the access point.

Figure 17:
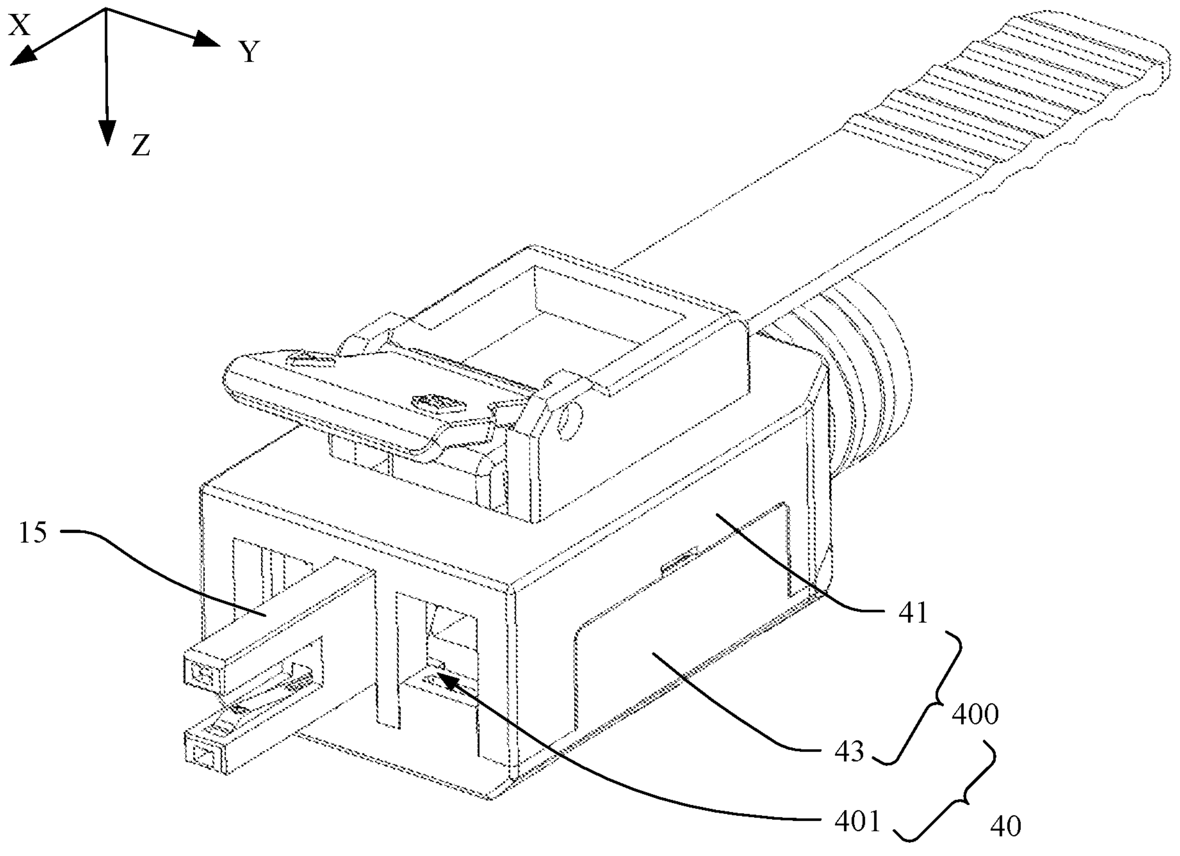
FIG. 17 is a schematic three-dimensional assembly diagram of the optical/electrical hybrid male connector shown in FIG. 16 after an optical connector is removed.

Refer to FIG. 17. The male base 40 includes a base body 400 and two male accommodating channels 401 disposed on the base body 400. The base body 400 includes a main body 41 and a cover body 43 that covers the main body 41. The main body 41 and the cover body 43 jointly enclose to form the two male accommodating channels 401. The two male accommodating channels 401 one-to-one correspond to the two optical connectors 13. The male accommodating channel 401 is used to mount the optical connector 13. The male electrical connector 15 is disposed on the main body 41. In this embodiment, the male electrical connector 15 is detachably disposed on the main body 41. It may be understood that the male electrical connector 15 may be disposed on at least one of the main body 41 and the cover body 43. For example, in an embodiment, the male electrical connector 15 may also be disposed on the cover body 43, the male electrical connector 15 may be disposed with the main body 41 or the cover body 43 as a whole, and the male electrical connector 15 is detachably disposed on the main body 41 or the cover body 43.

When the optical connector 13 is assembled on the male base 40, the optical connector 13 may be first mounted on the main body 41, and then the cover body 43 is fastened and covered on the main body 41, and the main body 41 and the cover body 43 jointly enclose to form the male accommodating channel 401 for installing the optical connector 13. Because a position of the optical connector 13 can be limited on the male base 40 by an inner wall of the male accommodating channel 401, the optical connector 13 and the male base 40 are connected as a whole, and is hard to get loose. This helps reduce a possibility of a relative position change between the optical connector 13 and the male base 40, thereby improving stability and quality of the optical signal transmitted by the optical connector 13. In addition, the main body 41 and the cover body 43 form the base body 400, which is conducive to enhancing strength of the male base 40.

There are two male accommodating channels 401 on the male base 40, which can effectively reduce tolerance and precision of the optical/electrical hybrid male connector 10, and help reduce production difficulty and production costs of the optical/electrical hybrid male connector 10. In this embodiment, the optical connector 13 is an LC connector, and the male accommodating channel 401 adapts to the LC connector. The optical connector 13 uses a standard LC connector, so that an application range of the optical/electrical hybrid male connector 10 is increased.

Because the optical connector 13 and the male electrical connector 15 are disposed on the optical/electrical hybrid male connector 10, the optical/electrical hybrid male connector 10 integrates the optical connector and the electrical connector as a whole, in other words, the optical/electrical hybrid male connector 10 has an optical interface and is compatible with an electrical interface, to implement synchronous insertion and removal of the optical connector and the electrical connector, thereby facilitating assembly and disassembly of the optical/electrical hybrid male connector 10 and the female connector 30. In addition, the male electrical connector 15 is located between the two optical connectors 13, so that idle space between the two optical connectors 13 of the optical/electrical hybrid male connector 10 is effectively used without occupying other space, thereby improving space utilization of the optical/electrical hybrid male connector 10.

It may be understood that a quantity of male accommodating channels 401 is not limited to two, the quantity of male accommodating channels 401 may be more than two, a quantity of optical connectors 13 is not limited to two, the quantity of optical connectors 13 may be more than two, at least two male accommodating channels 401 one-to-one correspond to at least two optical connectors 13, and each optical connector 13 is mounted on one corresponding male accommodating channel 401. There may be at least one male electrical connector 15.

Figure 18:
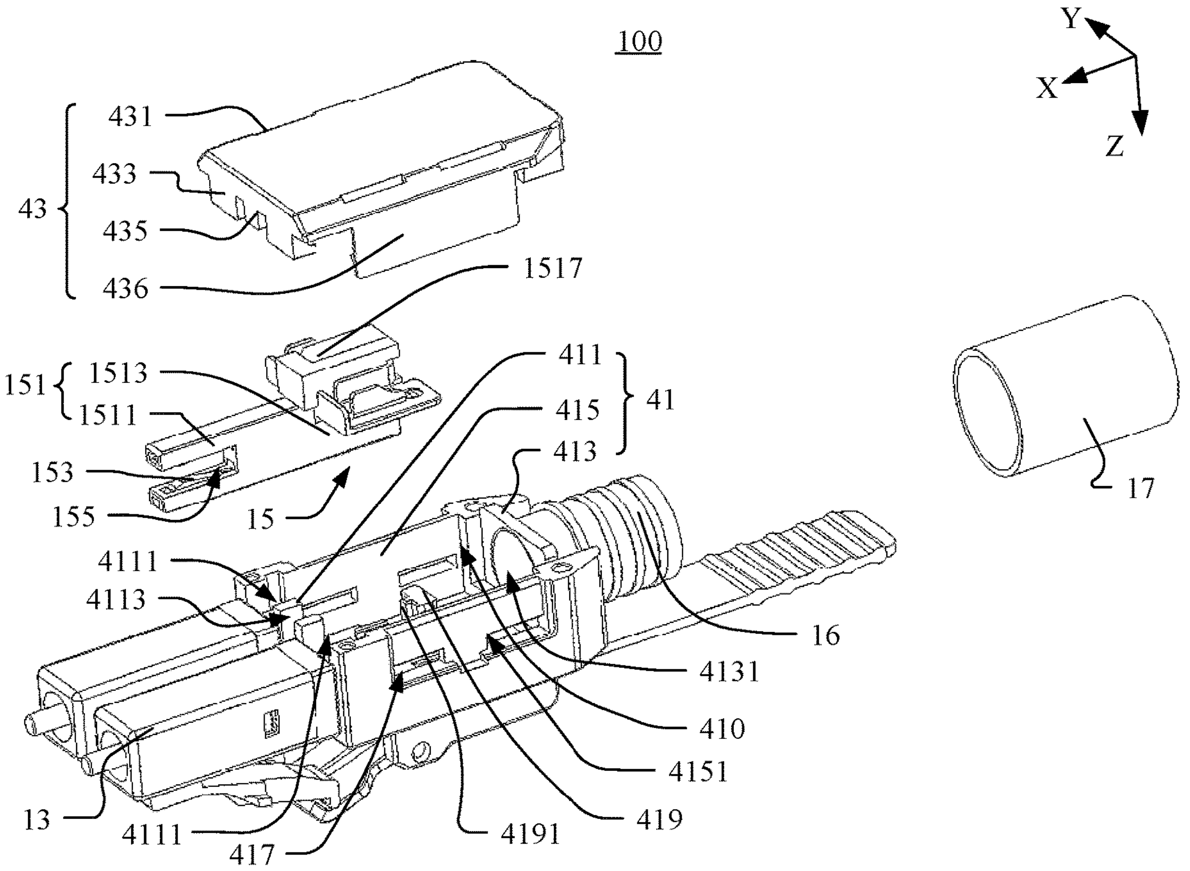
FIG. 18 is a schematic three-dimensional exploded view from a first angle of view of the optical/electrical hybrid male connector shown in FIG. 16.
Figure 19:
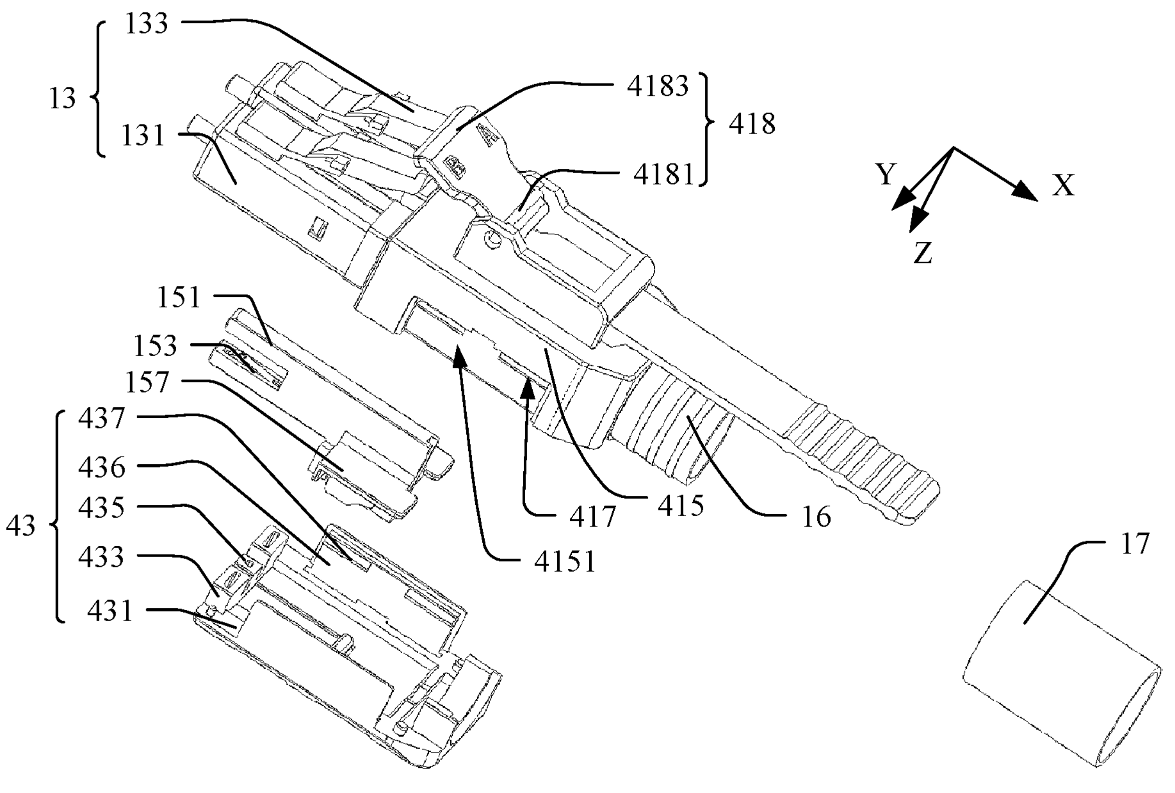
FIG. 19 is a schematic three-dimensional exploded view from a second angle of view of the optical/electrical hybrid male connector shown in FIG. 16.
Figure 20:
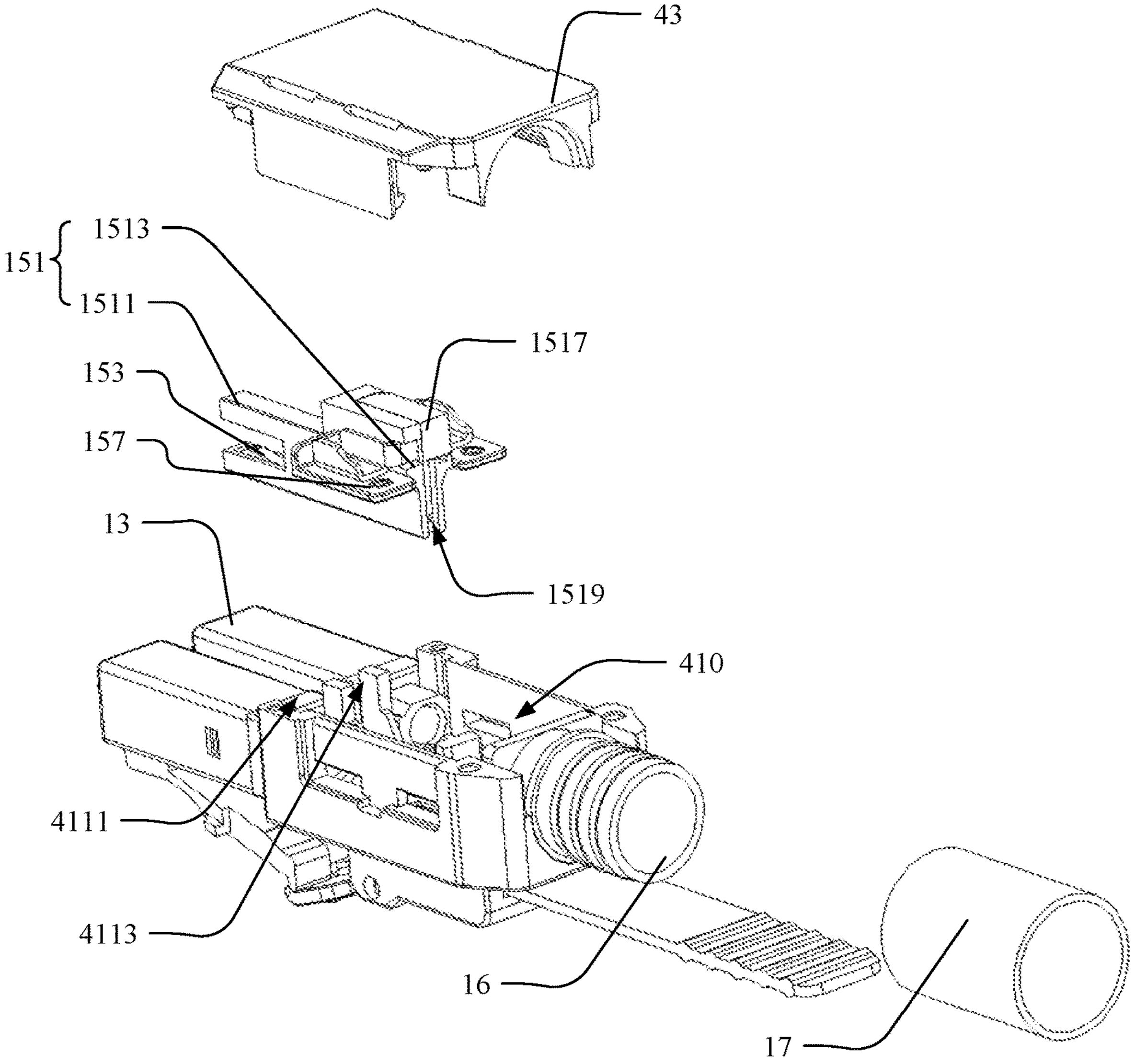
FIG. 20 is a schematic three-dimensional exploded view from a third angle of view of the optical/electrical hybrid male connector shown in FIG. 16.

Refer to FIG. 18, FIG. 19, and FIG. 20. Specifically, the main body 41 has a hollow cavity 410. The main body 41 includes a first end wall 411 and a second end wall 413 that are oppositely disposed in a first direction (an X direction shown in FIG. 18). The first end wall 411 is provided with two male accommodating slots 4111 in communication with the hollow cavity 410, and the two male accommodating slots 4111 are used for inserting the optical connector 13.

The first end wall 411 is further provided with a mounting slot 4113 in communication with the hollow cavity 410, and the mounting slot 4113 is used for installing the male electrical connector 15. The two male accommodating slots 4111 are spaced in a second direction (a Y direction shown in FIG. 18), and the second direction is different from the first direction. The mounting slot 4113 is located between the two male accommodating slots 4111. It may be understood that there is at least one mounting slot 4113, each male electrical connector 15 is correspondingly penetratedly disposed into one mounting slot 4113, and each mounting slot 4113 is correspondingly located between the two male accommodating slots 4111.

The main body 41 further includes a peripheral wall 415. The peripheral wall 415 is connected between the first end wall 411 and the second end wall 413. The peripheral wall 415, the first end wall 411, and the second end wall 413 jointly enclose to form the hollow cavity 410.

A groove 4151 is formed on an outer surface that is of the peripheral wall 415 and that faces away from the hollow cavity 410. A mounting part 436 is accommodated in the groove 4151, to effectively use space of the main body 41, and facilitate miniaturization of the optical/electrical hybrid male connector 10. In this embodiment, a first fastener part 417 is disposed on an inner wall of the groove 4151 of the main body 41, and is configured to be latched to the cover body 43.

The main body 41 further includes a male latch 418 (as shown in FIG. 19), the male latch 418 includes a fastened end 4181 and a pre-pressed end 4183 that are oppositely disposed, and the fastened end 4181 is fastenedly connected to an outer surface of the peripheral wall 415. The pre-pressed end 4183 is used to pre-press the optical connector 13.

The cover body 43 includes a cover part 431, two position-limiting parts 433, and one limiting part 435 that are connectedly disposed. The cover part 431 covers the main body 41 and covers the hollow cavity 410, and is configured to close the hollow cavity 410, to reduce dust and/or impurities from entering the hollow cavity 410.

The male accommodating slot 4111 penetrates through an end face that is of the first end wall 411 and that faces the cover part 431 to form a first opening, to facilitate the optical connector 13 to enter from the first opening during assembly, thereby facilitating the optical connector 13 to be assembled on the male base 40. The two position-limiting parts 433 one-to-one correspond to the two male accommodating slots 4111. The two position-limiting parts 433 are protrudedly disposed on the cover part 431. Each position-limiting part 433 may be correspondingly accommodated in one male accommodating slot 4111, and is enclosed jointly with an inner wall of the male accommodating slot 4111 to form the male accommodating channel 401. The position-limiting part 433 can abut against the optical connector 13 when the optical connector 13 is inserted into the male accommodating channel 401, to limit a position of the optical connector 13 relative to the male base 40. When the optical connector 13 is mounted on the male accommodating channel 401, the position-limiting part 433 and the optical connector 13 are stacked in a third direction, the first direction is different from the third direction, and the second direction is different from the third direction. The position-limiting part 433 can reduce movement of the optical connector 13 relative to the male base 40, and improve stability of installing the optical connector 13 on the male base 40.

It may be understood that the position-limiting part 433 may be omitted. In some embodiments, a first position-limiting slot is disposed on the cover part 431, and a position of the first position-limiting slot is corresponding to a position of the male accommodating slot 4111. When the cover part 431 covers the main body 41, an inner wall of the first position-limiting slot and an inner wall of the male accommodating slot 4111 jointly enclose to form the male accommodating channel 401.

The limiting part 435 is protrudedly disposed on the cover part 431. The limiting part 435 is located between the two position-limiting parts 433. The limiting part 435 may be accommodated in the mounting slot 4113, and enclose to form the mounting channel 403 jointly with an inner wall of the mounting slot 4113. The limiting part 435 can abut against the male electrical connector 15 when the male electrical connector 15 is inserted into the mounting channel 403, to limit a position of the male electrical connector 15 relative to the male base 40. When the optical connector 13 is mounted on the mounting channel 403, the limiting part 435 and the optical connector 13 are stacked in the third direction. The limiting part 435 can reduce movement of the optical connector 13 relative to the male base 40, and improve stability of installing the male electrical connector 15 on the male base 40.

It may be understood that the limiting part 435 may be omitted, a second position-limiting slot is disposed on the cover part 431, and a position of the second position-limiting slot is corresponding to a position of the mounting slot 4113. When the cover part 431 covers the main body 41, an inner wall of the second position-limiting slot and an inner wall of the mounting slot 4113 jointly enclose to form the mounting channel.

The cover body 43 further includes the mounting part 436. The mounting part 436 is connected to an edge of the cover part 431, and the mounting part 436 may move relative to the cover part 431, to facilitate assembling the cover body 43 on the main body 41 or removing the cover body 43 from the main body 41.

A second fastener part 437 is disposed on the mounting part 436 of the cover body 43. The second fastener part 437 is disposed on an inner surface that faces the hollow cavity 410 when the mounting part 436 is accommodated in the groove 4151. The second fastener part 437 is connected to the first fastener part 417, so that the cover body 43 is fastened on the main body 41. The second fastener part 437 is connected to the first fastener part 417, so that the main body 41 and the cover body 43 are detachably connected together, thereby facilitating assembly and disassembly of the male base 40.

In this embodiment, the first fastener part 417 is a clamping hole in communication with the hollow cavity 410, the second fastener part 437 is a latch, and the latch and the clamping hole can be latched together. It may be understood that a position of the first fastener part 417 on the main body 41 is not limited in this application. For example, no groove 4151 is disposed on the peripheral wall 415, and the first fastener part 417 is disposed on an outer surface that is of the peripheral wall 415 and that faces away from the hollow cavity 410. It may be understood that a position of the second fastener part 437 on the cover body 43 is not limited in this application. For example, the cover body 43 may omit the mounting part 436, the second fastener part 437 is disposed on the cover part 431, and the first fastener part 417 and the second fastener part 437 can be latched together. In some embodiments, the first fastener part 417 may be a latch, the second fastener part 437 may be a clamping hole, one of the first fastener part 417 and the second fastener part 437 may be a clamping hole, the other of the first fastener part 417 and the second fastener part 437 is a latch, and the latch and the clamping hole are latched.

It may be understood that a connection manner between the main body 41 and the cover body 43 is not limited in this application. For example, after the optical connector 13, the male electrical connector 15, and the main body 41 are assembled, the cover body 43 may be fastenedly covered on the main body 41 in a manner of gel, screw connection, or the like, to close the hollow cavity 410.

The optical connector 13 includes a body 131 and a connection latch 133 that is protrudedly disposed on the body 131. When the optical connector 13 is mounted on the male base 40, the pre-pressed end 4183 abuts against the connection latch 133 of the optical connector 13. The optical connector 13 is pre-pressed by using the male latch 418, so that connection stability between the optical connector 13 and the male accommodating channel 401 is improved.

It may be understood that a connection manner of the body 131 of the optical connector 13 and the male accommodating channel 401 is not limited. For example, the optical connector 13 and the inner wall of the male accommodating channel 401 may be connected together in a manner of screw connection, to enhance connection stability between the optical connector 13 and the inner wall of the male accommodating channel 401.

The optical connector 13 is configured to connect to an optical cable (not shown in the figure). The optical cable includes an inner layer (not shown in the figure) and a sheath (not shown in the figure) that wraps an outer surface of the inner layer. The inner layer has an optical fiber. Refer to FIG. 19 again. The optical/electrical hybrid male connector 10 further includes a crimping bushing 16 and a crimping pipe 17. A through hole 4131 is disposed on the second end wall 413. One end of the crimping bushing 16 is fastened to the through hole 4131. The crimping bushing 16 is configured to be penetratedly disposed on the inner layer of the optical cable. The crimping pipe 17 is sleeved on the crimping bushing 16, and is configured to clamp a sheath between the crimping bushing 16 and the crimping pipe 17 together with the crimping bushing 16. When the optical connector 13 is penetratedly disposed on the male accommodating channel 401, the inner layer of the optical cable connected to the optical connector 13 is penetratedly disposed into the hollow cavity 410 and the crimping bushing 17. The sheath is located between the crimping pipe 17 and the crimping bushing 16. The crimping pipe 17 and the crimping bushing 16 jointly clamp the sheath, so that connection stability of the optical cable and the optical/electrical hybrid male connector 10 can be improved, and tensile strength of the optical cable can be improved.

Figure 21:
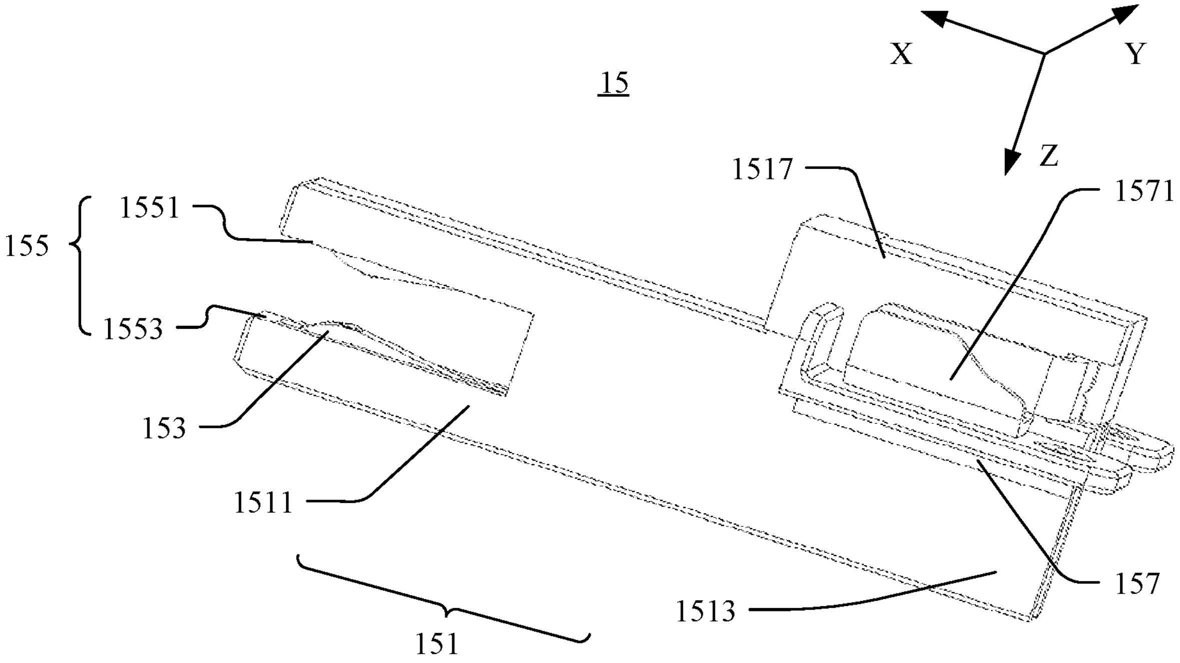
FIG. 21 is a schematic three-dimensional diagram of a male electrical connector.

Refer to FIG. 18 and FIG. 21. The male electrical connector 15 includes a male insertion part 151 and a male contact terminal 153. The male insertion part 151 is penetratedly disposed into the mounting slot 4113 and is exposed outside the main body 41, and is configured to insert the female connector 30. The male insertion part 151 includes a first end 1511 and a second end 1513 that are oppositely disposed in a first direction. The first end 1511 is located outside the main body 41. The second end 1513 is located in the hollow cavity 410 of the main body 41. An insertion slot 155 is disposed on an end face that is of the first end 1511 and that faces away from the main body 41. The insertion slot 155 is located outside the main body 41, and is configured to cooperate with the female connector 30 in an insertion manner. The male contact terminal 153 is disposed on an inner wall of the insertion slot 155, and is configured to electrically connect to the female connector 30.

Because the mounting slot 4113 is located between the two male accommodating channels 401, after the optical/electrical hybrid male connector 10 is assembled, the male electrical connector 15 is located between the two optical connectors 13. Therefore, idle space between the two optical connectors 13 of the optical/electrical hybrid male connector 10 is effectively used without occupying other space, thereby improving space utilization of the optical/electrical hybrid male connector 10.

In this embodiment, the male accommodating channel 401 extends in a first direction (for example, an X direction shown in FIG. 17). The first direction is an axial direction of the optical/electrical hybrid male connector 10. The two male accommodating channels 401 are arranged in a second direction (for example, a Y direction shown in FIG. 17). When the optical connector 13 is penetratedly mounted on the male accommodating channel 401, the two optical connectors 13 and the male electrical connector 15 are arranged in the second direction.

There are two male contact terminals 153 (as shown in FIG. 21) on each male electrical connector 15. The inner wall of the insertion slot 155 includes a first side wall 1551 (as shown in FIG. 21) and a second side wall 1553 (as shown in FIG. 21). The first side wall 1551 and the second side wall 1553 oppositely disposed in a third direction (for example, a Z direction shown in FIG. 21), and any two of the first direction, the second direction, and the third direction are orthogonal to each other. One male contact terminal 153 is disposed on the first side wall 1551, and the other male contact terminal 153 is disposed on the second side wall 1553.

Because the two male contact terminals 153 are disposed on the inner wall of the insertion slot 155 in the third direction (that is, a thickness direction of the optical/electrical hybrid male connector 10), and do not occupy space in an arrangement direction of the male accommodating channels 401 (that is, a transverse direction of the optical/electrical hybrid male connector 10), the male contact terminal 153 and the optical connector 13 do not interfere with each other or affect each other. In other words, the male contact terminal 153 effectively uses idle space of the male base 40 in the third direction, space utilization of the optical/electrical hybrid male connector 10 is further improved, and a volume of the optical/electrical hybrid male connector 10 is effectively reduced, thereby facilitating miniaturization development of the optical/electrical hybrid male connector 10. In this embodiment, the male insertion part 151 is an insulator. For example, the insulator includes plastic.

The second end 1513 of the male insertion part 151 forms an abutment structure 1517, and the abutment structure 1517 is accommodated in the hollow cavity 410 of the main body 41. The abutment structure 1517 abuts against an inner surface that is of the first end wall 411 and that faces the hollow cavity 410 (as shown in FIG. 18). The abutment structure 1517 is configured to limit a relative position between the male electrical connector 15 and the main body 41, reduce a possibility that the male electrical connector 15 moves relative to the main body 41 in the first direction, and prevent the male electrical connector 15 from being detached from the main body 41.

In this embodiment, the main body 41 further includes a blocking part 419 (as shown in FIG. 18) that is protrudedly disposed on an inner wall of the hollow cavity 410. The male insertion part 151 is located between the first end wall 411 and the blocking part 419 when the male electrical connector 15 is mounted on the main body 41. The second end 1513 of the male insertion part 151 is in contact with the blocking part 419. Due to a limitation function of the first end wall 411 and the blocking part 419, a possibility that the male electrical connector 15 moves in the first direction (for example, vibration) relative to the male base 40 is reduced, and stability of the male electrical connector 15 on the male base 40 is improved.

A first guiding part 4191 (as shown in FIG. 18) is disposed on a surface that is of the blocking part 419 of the main body 41 and that faces the first end wall 411. A second guiding part 1519 (as shown in FIG. 20) is formed on an end face that is of the second end 1513 of the male electrical connector 15 and that faces away from the first end 1511. The first guiding part 4191 is slidably connected to the second guiding part 1519, and is configured to guide the male electrical connector 15 when the male electrical connector 15 is inserted into the mounting slot 4113. The first guiding part 4191 is a protrusion that is protrudedly disposed on the blocking part 419, and the protrusion extends in the third direction. The second guiding part 1519 is a groove recessed on an end face that is of the male insertion part 1513 and that faces away from the first end 1511, and the protrusion is accommodated in the groove and is slidably connected to the groove.

It may be understood that structures of the first guiding part 4191 and the second guiding part 1519 are not limited in this application. For example, the first guiding part 4191 may be a groove, and the second guiding part 1519 may be a protrusion.

The male electrical connector 15 further includes a power supply contact part 157. The power supply contact part 157 is protrudedly disposed on the male insertion part 151 and accommodated in the hollow cavity 410 of the main body 41. The power supply contact part 157 is electrically connected to the male contact terminal 153, and is configured to electrically connect to another electrical connector (for example, a cable) or apparatus. A fastening structure 1571 is further disposed on the power supply contact part 157, and is configured to clamp an electric conductor.

It may be understood that the male electrical connector 15 is not limited to being mounted on the mounting channel 403. For example, in some embodiments, the male electrical connector 15 is protrudedly disposed on a side that is of the first end wall 411 and that faces away from the second end wall 413, and at least partially exposed outside the main body 41.

Refer to FIG. 14 and FIG. 15. The female connector 30 has a coupling interface 31. The coupling interface 31 is provided with two female accommodating channels 311. The female accommodating channel 311 is used to mount the optical connector 13, the coupling interface 31 is further provided with a female electrical connector 35, and the female electrical connector 35 is located between the two female accommodating channels 311. The optical connector 13 is inserted into the female accommodating channel 311. The male electrical connector 15 is electrically connected to the female electrical connector 35. A structure of the female connector 30 provided in the third embodiment is approximately similar to a structure of the female connector provided in the first embodiment. Details are not described herein again.

The foregoing descriptions are merely specific embodiments of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. An optical/electrical hybrid male connector, comprising:

a male base and at least two optical connectors, wherein the male base comprises a base body, wherein the at least two optical connectors are disposed on the base body;

wherein the optical/electrical hybrid male connector further comprises at least one male electrical connector disposed on the base body, and the at least one male electrical connector is located between two of the at least two optical connectors;

wherein each of the at least one male electrical connector comprises a male insertion part and two male contact terminals, an insertion slot is on an end face of the male insertion part that faces away from the base body, and the two male contact terminals are disposed on an inner wall of the insertion slot; and wherein the at least two optical connectors are arranged in a first direction, the inner wall of the insertion slot comprises a first side wall and a second side wall, the first side wall and the second side wall are oppositely disposed in a second direction, the first direction and the second direction are orthogonal to each other, a first male contact terminal of the two male contact terminals is disposed on the first side wall, and a second male contact terminal of the two male contact terminals is disposed on the second side wall.

2. The optical/electrical hybrid male connector according to claim 1, wherein the male base further comprises at least two male accommodating channels disposed on the base body, the at least two male accommodating channels one-to-one correspond to the at least two optical connectors, and each of the at least two optical connectors is mounted on one corresponding male accommodating channel; and wherein the at least two male accommodating channels extend in a third direction, the at least two male accommodating channels are arranged in the first direction, any two of the first direction, the second direction and the third direction are orthogonal to each other.

3. The optical/electrical hybrid male connector according to claim 2, wherein the base body comprises a support part and at least one connection part that is disposed on the support part, a male cable routing structure electrically connected to a male contact terminal is disposed on the support part, and the at least one connection part is disposed with the at least two male accommodating channels.

4. The optical/electrical hybrid male connector according to claim 3, wherein the male base further comprises a male latch, the male latch comprises a fastened end and a pre-pressed end that are oppositely disposed, the fastened end is connected to a top surface of the at least one connection part and that faces away from the support part, and the pre-pressed end abuts against an optical connector mounted on a male accommodating channel.

5. The optical/electrical hybrid male connector according to claim 1, wherein a male clamping protrusion is disposed on an inner wall of the male accommodating channel, and the male clamping protrusion is latched to an optical connector mounted on a male accommodating channel.

6. The optical/electrical hybrid male connector according to claim 1, wherein each of the at least two optical connectors is an LC connector.

7. An electronic device, comprising an optical/electrical hybrid male connector comprising:

a male base and at least two optical connectors, wherein the male base comprises a base body, wherein the at least two optical connectors are disposed on the base body;

wherein the optical/electrical hybrid male connector further comprises at least one male electrical connector disposed on the base body, and the at least one male electrical connector is located between two of the at least two optical connectors;

wherein each of the at least one male electrical connector comprises a male insertion part and two male contact terminals, an insertion slot is on an end face of the male insertion part that faces away from the base body, and the two male contact terminals are disposed on an inner wall of the insertion slot; and wherein the at least two optical connectors are arranged in a first direction, the inner wall of the insertion slot comprises a first side wall and a second side wall, the first side wall and the second side wall are oppositely disposed in a second direction, the first direction and the second direction are orthogonal to each other, a first male contact terminal of the two male contact terminals is disposed on the first side wall, and a second male contact terminal of the two male contact terminals is disposed on the second side wall.

8. The electronic device according to claim 7, wherein the male base further comprises at least two male accommodating channels disposed on the base body, the at least two male accommodating channels one-to-one correspond to the at least two optical connectors, and each of the at least two optical connectors is mounted on one corresponding male accommodating channel, and wherein the at least two male accommodating channels extend in a third direction, the at least two male accommodating channels are arranged in the first direction, any two of the first direction, the second direction and the third direction are orthogonal to each other.

9. The electronic device according to claim 8, wherein the base body comprises a support part and at least one connection part that is disposed on the support part, a male cable routing structure electrically connected to a male contact terminal is disposed on the support part, and the at least one connection part is disposed with the at least two male accommodating channels.

10. The electronic device according to claim 9, wherein the male base further comprises a male latch, the male latch comprises a fastened end and a pre-pressed end that are oppositely disposed, the fastened end is connected to a top surface of the at least one connection part and that faces away from the support part, and the pre-pressed end abuts against an optical connector mounted on a male accommodating channel.

11. The electronic device according to claim 7, wherein a male clamping protrusion is disposed on an inner wall of the male accommodating channel, and the male clamping protrusion is latched to an optical connector mounted on a male accommodating channel.

* * * * *